(12) United States Patent
Mizusaki

(10) Patent No.: US 11,009,750 B2
(45) Date of Patent: May 18, 2021

(54) LIQUID CRYSTAL DISPLAY DEVICE AND METHOD FOR PRODUCING LIQUID CRYSTAL DISPLAY DEVICE

(71) Applicant: SHARP KABUSHIKI KAISHA, Sakai (JP)

(72) Inventor: Masanobu Mizusaki, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 103 days.

(21) Appl. No.: 16/252,089

(22) Filed: Jan. 18, 2019

(65) Prior Publication Data

US 2019/0227387 A1 Jul. 25, 2019

(30) Foreign Application Priority Data

Jan. 22, 2018 (JP) .............................. JP2018-008202

(51) Int. Cl.
*G02F 1/1337* (2006.01)
*G02F 1/1343* (2006.01)
(Continued)

(52) U.S. Cl.
CPC .... *G02F 1/133723* (2013.01); *C09K 19/2028* (2013.01); *C09K 19/542* (2013.01);
(Continued)

(58) Field of Classification Search
CPC ......... G02F 1/133711; G02F 1/133723; G02F 1/1337; G02F 1/133788; G02F 1/1334; G02F 1/13; G02F 2001/133715; C09K 19/3852; C09K 19/542; C09K 2019/548; C09K 2019/161; C09K 2019/0448; C09K 2323/00; C09K 2323/02; C09K 2323/027; Y10T 428/10; Y10T 428/1005;
(Continued)

(56) References Cited

U.S. PATENT DOCUMENTS

2003/0086044 A1  5/2003  Inoue et al.
2005/0253988 A1  11/2005  Inoue et al.
(Continued)

FOREIGN PATENT DOCUMENTS

JP   2003-177418 A   6/2003
WO   2011/001579 A1  1/2011
(Continued)

*Primary Examiner* — Ruiyun Zhang
(74) *Attorney, Agent, or Firm* — ScienBiziP, P.C.

(57) ABSTRACT

The present invention provides a liquid crystal display device that includes: a pair of substrates; a liquid crystal layer held between the substrates; an alignment film disposed on a liquid crystal layer side surface of at least one of the substrates; and a polymer layer disposed between the liquid crystal layer and the alignment film, the liquid crystal layer containing liquid crystal compounds aligned in a predetermined direction with no voltage applied, the alignment film containing a first polymer containing in its main chain at least one selected from a polyamic acid structure and a polyimide structure, the first polymer containing a functional group that functions as a polymerization initiator, the polymer layer containing a second polymer obtained by polymerizing at least one monomer containing a chalcone group.

9 Claims, 2 Drawing Sheets

(51) Int. Cl.
*G02F 1/1339* (2006.01)
*C09K 19/54* (2006.01)
*C09K 19/56* (2006.01)
*C09K 19/20* (2006.01)
*C09K 19/04* (2006.01)
*G02F 1/1333* (2006.01)

(52) U.S. Cl.
CPC ............ *C09K 19/56* (2013.01); *G02F 1/1339* (2013.01); *G02F 1/134363* (2013.01); *C09K 2019/0448* (2013.01); *C09K 2019/548* (2013.01); *C09K 2323/00* (2020.08); *C09K 2323/02* (2020.08); *G02F 1/133397* (2021.01); *G02F 1/134372* (2021.01); *G02F 2202/022* (2013.01)

(58) Field of Classification Search
CPC ............... Y10T 428/1023; C08F 20/30; C08F 220/302; C08F 220/303

USPC ......... 428/1.1, 1.2, 1.26; 349/123, 127, 129, 349/130, 132, 187
See application file for complete search history.

(56) References Cited

U.S. PATENT DOCUMENTS

| 2012/0092603 | A1 | 4/2012 | Mizusaki |
| 2015/0234236 | A1 | 8/2015 | Ohnishi et al. |
| 2018/0321560 | A1* | 11/2018 | Nakanishi ......... G02F 1/133788 |

FOREIGN PATENT DOCUMENTS

| WO | 2014/038431 A1 | 3/2014 | |
| WO | WO-2017057162 A1 * | 4/2017 | ......... H01L 27/1214 |

* cited by examiner

LIQUID CRYSTAL DISPLAY DEVICE AND METHOD FOR PRODUCING LIQUID CRYSTAL DISPLAY DEVICE

CROSS-REFERENCE TO RELATED APPLICATIONS

The present application claims priority under 35 U.S.C. § 119 to Japanese Patent Application No. 2018-008202 filed on Jan. 22, 2018, the contents of which are incorporated herein by reference in their entirety.

BACKGROUND OF THE INVENTION

Field of the Invention

The present invention relates to liquid crystal display devices and methods for producing a liquid crystal display device. The present invention specifically relates to a horizontal alignment mode or vertical alignment mode liquid crystal display device including a polymer layer, and a production method thereof.

Description of Related Art

Displays such as liquid crystal display devices have spread rapidly and have been used in a wide variety of applications including televisions, electronic book readers, digital photo frames, industrial appliances, personal computers (PCs), tablet PCs, smartphones, and HMDs. Liquid crystal display devices are required to have a variety of properties in these applications, and thus a variety of liquid crystal display modes have been developed.

The orientation of a liquid crystal material in a liquid crystal display device with no voltage applied is usually controlled by an alignment film on which alignment treatment has been performed. The alignment film is formed by, for example, applying an alignment film material such as a polyamic acid to a substrate and baking the material. Another technique developed to control the orientation of a liquid crystal material is a polymer sustained alignment, technique (hereinafter, also referred to as the PSA technique), which polymerizes a polymerizable monomer added to a liquid crystal layer so as to form a polymer layer configured to control the orientation of a liquid crystal material on a surface of an alignment film (for example, JP 2003-177418 A, WO 2011/001579, and WO 2014/038431).

BRIEF SUMMARY OF THE INVENTION

In the case where the PSA technique is applied to a liquid crystal display device in a mode such as the in-plane switching (IPS) or fringe field switching (FFS) mode utilizing a photo-alignment technique, a vertical alignment mode, or a 4-domain reverse twisted nematic (4D-RTN) mode, a polymerization initiator cannot be used. Such a liquid crystal display device therefore causes a throughput decrease due to excessively long ultraviolet light irradiation duration and, simultaneously, the voltage holding ratio (VHR) decreases and the residual DC (rDC) voltage increases after long-term use of the liquid crystal display device due to the increased ultraviolet light irradiation dose, thereby decreasing the reliability. These undesirable changes are caused by radicals generated from polymerizable monomers remaining slightly in the liquid crystal layer.

To deal with these changes, the present inventor has studied use of a polymerization initiator with a polymerizable group (hereinafter, also referred to as an initiator monomer). The studies, however, found that as the amount of the initiator monomer introduced into the liquid crystal material increases, the concentration of impurities from the initiator monomer increases, causing image sticking due to the VHR decrease and the residual DC voltage increase. This means that the VHR decreases and the residual DC voltage increases even when an initiator monomer or a polymerization initiator is introduced into a liquid crystal material since they remain in the liquid crystal layer, though only slightly.

The same undesirable changes are presumed to occur in the liquid crystal display device disclosed in JP 2003-177418 A.

The liquid crystal display devices disclosed in WO 2011/001579 and WO 2014/038431 use a biphenyl-based monomer or a phenanthrene-based monomer, and can still be improved in terms of reduction in the VHR decrease, especially in the vertical alignment modes. These liquid crystal display devices require alignment treatment in horizontal alignment modes, and can still be improved in terms of simplification of the production process.

In response to the above issues, an object of the present invention is to provide a liquid crystal display device capable of maintaining a favorable voltage holding ratio and exhibiting reduced residual DC voltage for a long period of time, and a method for producing a liquid crystal display device which enables production of such a liquid crystal display device.

In other words, one aspect of the present invention may be a liquid crystal display device including: a pair of substrates; a liquid crystal layer held between the substrates; an alignment film disposed on a liquid crystal layer side surface of at least one of the substrates; and a polymer layer disposed between the liquid crystal layer and the alignment film, the liquid crystal layer containing liquid crystal compounds aligned in a predetermined direction with no voltage applied, the alignment film containing a first polymer containing in its main chain at least one selected from a polyamic acid structure and a polyimide structure, the first polymer containing at least one selected from a functional group represented by the following formula (A-1) and a functional group represented by the following formula (A-2), the polymer layer containing a second polymer obtained by polymerizing at least one monomer including at least one monomer represented by the following formula (1):

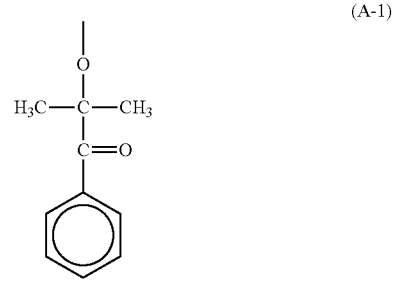

(A-1)

-continued

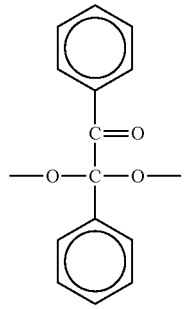

(A-2)

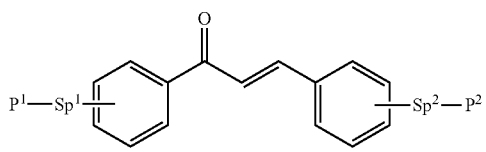

(1)

wherein P¹ and P² are the same as or different from each other, and each represent an acryloyloxy, methacryloyloxy, acryloylamino, methacryloylamino, vinyl, or vinyloxy group, Sp¹ and Sp² are the same as or different from each other, and each represent a C1-C6 linear, branched, or cyclic alkylene or alkyleneoxy group, or a direct bond, and at least one hydrogen atom in each phenylene group may be replaced.

Another aspect of the present invention may be a method for producing a liquid crystal display device including a liquid crystal layer containing liquid crystal compounds aligned in a predetermined direction with no voltage applied, the method including: preparing a pair of substrates; forming an alignment film by applying to a surface of at least one of the substrates an alignment agent that contains a first polymer containing at least one selected from a polyamic acid structure and a polyimide structure in its main chain and at least one selected from a functional group represented by the formula (A-1) and a functional group represented by the formula (A-2); forming a liquid crystal layer by sealing, between the substrates on at least one of which the alignment film is formed, a liquid crystal composition containing a liquid crystal material and at least one monomer including at least one monomer represented by the formula (1); and forming a polymer layer from a second polymer between the alignment film and the liquid crystal layer by irradiating the liquid crystal layer with ultraviolet light, the second polymer being obtained by polymerizing the at least one monomer including at least one monomer represented by the formula (1).

JP 2003-177418 A mentions a polymerization initiator, but discloses only a method including adding a polymerization initiator to a liquid crystal layer. JP 2003-177418 A fails to disclose introduction of at least one selected from a functional group represented by the formula (A-1) and a functional group represented by the formula (A-2) into an alignment film. WO 2011/001579 and WO 2014/038431 fail to examine the monomer represented by the formula (1).

The present invention achieves a liquid crystal display device capable of maintaining a favorable voltage holding ratio and reduced residual DC voltage for a long period of time.

BRIEF DESCRIPTION OF THE DRAWINGS

FIG. 1A illustrates monomers before polymerization, and FIG. 1B illustrates monomers after the polymerization.

DETAILED DESCRIPTION OF THE INVENTION

Figure 1A:
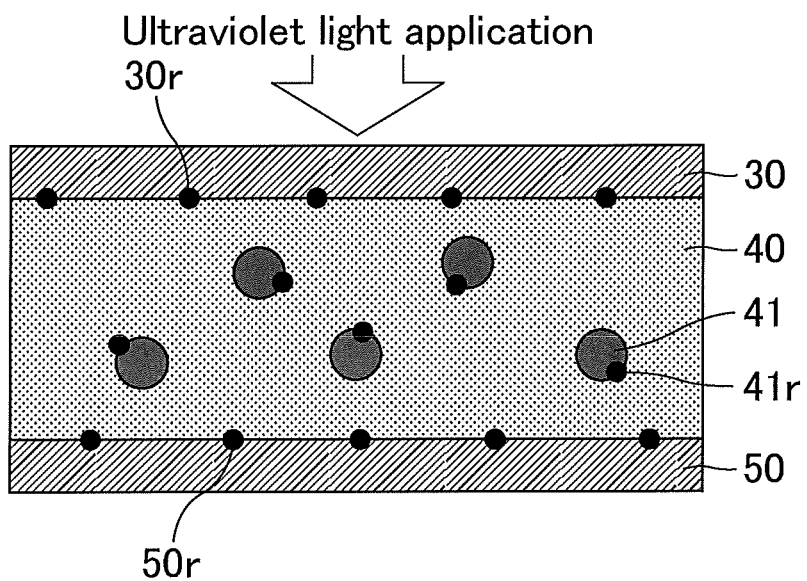
FIG. 1A and FIG. 1B are schematic cross-sectional views of a liquid crystal cell, illustrating polymer layer formation processes in a method for producing a liquid crystal display device of Embodiment 1.

The present invention is described in more detail below based on the following embodiment with reference to the drawing. The embodiment, however, is not intended to limit the scope of the present invention. The configurations of the embodiment may appropriately be combined or modified within the spirit of the present invention.

The "viewing surface side" as used herein means the side closer to the screen (display surface) of the display device. The "back surface side" means the side farther from the screen (display surface) of the display device. The "room temperature" is 15° C. or higher and 40° C. or lower, unless otherwise specified.

The "photo-functional group" as used herein means a functional group that can undergo a photoreaction. The photo-functional group preferably can undergo a structural change such as dimerization (formation of dimers), isomerization, photo-Fries rearrangement, and decomposition (cleavage) when irradiated with light (electromagnetic waves) such as ultraviolet rays or visible light, (preferably polarized light, more preferably polarized ultraviolet rays, particularly preferably linearly polarized ultraviolet rays), and thereby exhibit an ability of controlling the alignment of liquid crystal compounds. Specific examples of the photo-functional group include an azobenzene group, a chalcone group, a cinnamate group, a coumarin group, a tolane group, a stilbene group, and a cyclobutane ring.

The nematic-isotropic phase transition temperature (Tni) as used herein is determined by visually observing the liquid crystal state or the isotropic state while varying the temperature using a device such as one from Mettler. The temperature can also be determined by a technique of determining the temperature at which phase transition occurs using a differential scanning calorimeter (DSC).

The mode herein in which liquid crystal compounds (molecules) are aligned in a direction substantially parallel to a main surface of each of the pair of substrates with no voltage applied is also referred to as a horizontal alignment mode. The expression "substantially parallel" means that, for example, the pre-tilt angle of liquid crystal compounds is 0° or greater and 5° or smaller from the main surface of each substrate. The mode in which liquid crystal compounds are aligned in a direction substantially perpendicular to the main surface of each of the pair of substrates with no voltage applied is also referred to as a vertical alignment mode. The expression "substantially perpendicular" means that, for example, the pre-tilt angle of liquid crystal compounds is 85° or greater and 90° or smaller from the main surface of the substrate. The pre-tilt angle is an angle of the major axis of a liquid crystal material (liquid crystal compound) from a surface of a substrate when the voltage applied to the liquid crystal layer is lower than the threshold voltage (including the case of no voltage application), with the substrate surface taken as 0° and the line normal to the substrate as 90°. The present invention is applicable to both horizontal alignment mode liquid crystal display devices and vertical alignment mode liquid crystal display devices.

Embodiment 1

The present embodiment is summarized first. The present embodiment takes the following measures (1) and (2) to overcome the above issues.

(1) A polymer constituting an alignment film is chemically modified with (covalently bonded to) a functional group capable of initiating radical polymerization under light (hereinafter, also referred to as an initiator functional group).

In this measure, a polymerization initiator or an initiator monomer is not introduced into the liquid crystal layer, and the moiety functioning as a polymerization initiator can be immobilized on an alignment film surface. This prevents the polymerization initiator components from remaining in the liquid crystal layer, reducing generation of image sticking due to polymerization initiator components. Also, just adding a low molecular weight polymerization initiator into an alignment film may not be enough to prevent the polymerization initiator, which has a low molecular weight, from dissolving in the liquid crystal layer. The point is to introduce the initiator functional group into the polymer (preferably a side chain thereof) constituting the alignment film and covalently bond the polymer to the polymer layer.

(2) A bifunctional group (monomer having two polymerizable groups) containing a chalcone group (functional group derived from chalcone) is introduced into the liquid crystal layer.

Since chalcone groups become alignable when irradiated with polarized ultraviolet light unlike conventional monomers for PSA, a polymer layer (PSA layer) capable of horizontally aligning liquid crystal compounds when irradiated with polarized ultraviolet light can be formed (this process requires heating at the Tni of the liquid crystal material or higher). Chalcone is a chemical structure represented by the following formula (A). A monomer containing a chalcone group contains a carbonyl group (—C═O) and causes interaction between an unpaired electron of the carbonyl group and an unpaired electron of a polyimide (acid anhydride). A polymer of the monomer containing a chalcone group therefore easily separates from the liquid crystal layer to form a polymer layer.

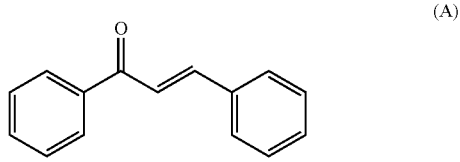 [SMILES: O=C(/C=C/c1ccccc1)c1ccccc1]

(A)

Figure 1B:
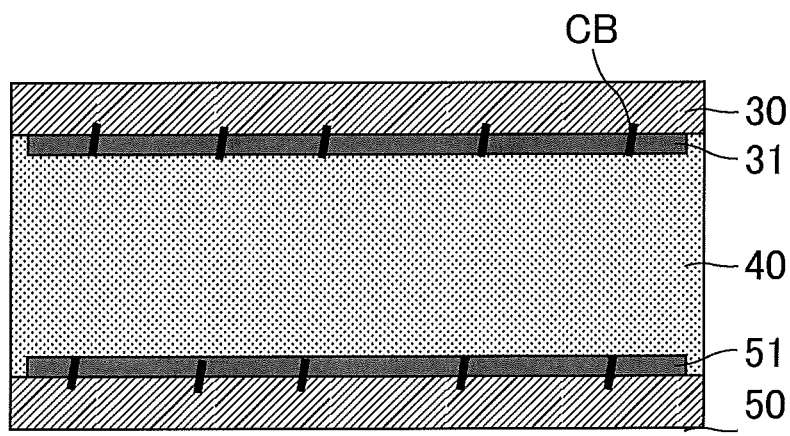

FIG. 1A and FIG. 1B are schematic cross-sectional views of a liquid crystal cell, illustrating polymer layer formation processes in a method for producing a liquid crystal display device of Embodiment 1; FIG. 1A illustrates monomers before polymerization, and FIG. 1B illustrates monomers after the polymerization. As shown in FIG. 1A, application of ultraviolet light not only generates radicals 41$r$ in monomers 41 but also generates radicals 30$r$ and 50$r$ in alignment films 30 and 50 (preferably, their polymer side chains), respectively. As shown in FIG. 1B, the monomers 41 in the liquid crystal layer 40 are covalently bonded to the alignment films 30 and 50 (preferably, their polymer side chains).

This enables the design of a PSA liquid crystal display device in which the alignment films 30 and 50 are bonded to the polymer layers 31 and 51 by covalent bonds CB, respectively. The covalent bonds between the alignment film 30 and the corresponding polymer layer 31 and between the alignment film 50 and the corresponding polymer layer 51 increase the polymerization rate of the monomers 41 to increase the formation rate of the polymer layer, leading to a favorable VHR and reduced rDC voltage in long-term use. With the monomers 41 containing a chalcone group in the liquid crystal layer 40, the polymer layers 31 and 51 capable of achieving the horizontal alignment can be formed by applying polarized ultraviolet light.

JP 2003-177418 A fails to disclose or suggest such features of the present embodiment. The liquid crystal display devices disclosed in WO 2011/001579 and WO 2014/038431 use a biphenyl-based monomer or a phenanthrene-based monomer as described above. In a horizontal alignment mode, biphenyl-based monomers and phenanthrene-based monomers are insufficient in enhancing the stability of the alignment direction of liquid crystal monomers. A monomer containing a chalcone group, which favorably absorbs polarized light, is suitable. Use of a monomer containing a chalcone group improves the horizontal alignment state of liquid crystal molecules, achieves a high contrast ratio, and enhances the alignment stability of liquid crystal molecules, thereby reducing the chances of a contrast ratio decrease in long-term use of the liquid crystal display device.

Figure 2:
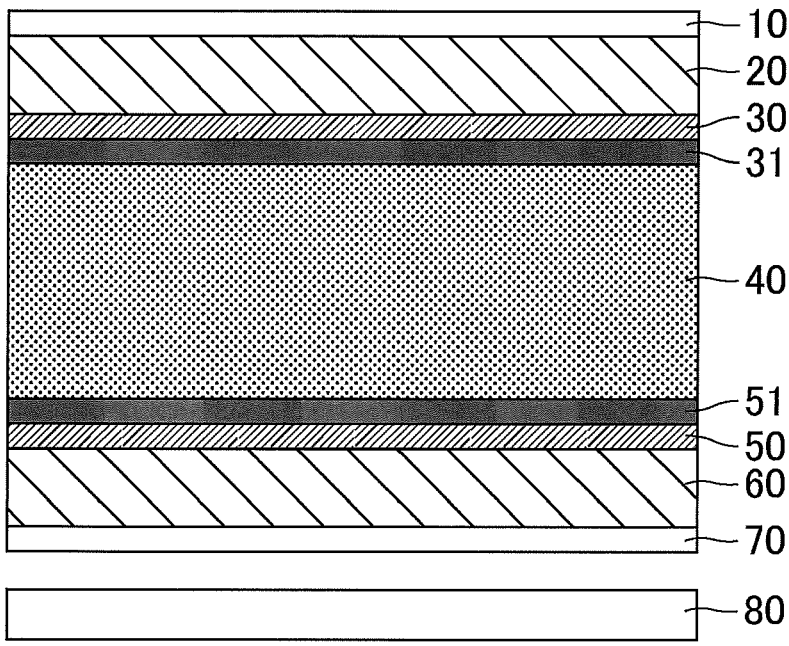
FIG. 2 is a schematic cross-sectional view of the liquid crystal display device of Embodiment 1.

FIG. 2 is a schematic cross-sectional view of a liquid crystal display device of Embodiment 1. As shown in FIG. 2, the liquid crystal display device of Embodiment 1 is a horizontal alignment mode or vertical alignment mode liquid crystal display device including, in the following order from the viewing surface side to the back surface side, a first linear polarizer 10, a counter substrate 20, an alignment film 30, a polymer layer 31, a liquid crystal layer 40, a polymer layer 51, an alignment film 50, a thin-film transistor (TFT) substrate 60, a second linear polarizer 70, and a backlight 80.

The first linear polarizer 10 can be, for example, a polarizer (absorptive polarizer) obtained by dyeing a polyvinyl alcohol (PVA) film with an anisotropic material such as an iodine complex (or dye) to adsorb the anisotropic material on the polyvinyl alcohol film, and stretching the film for alignment. Typically, each surface of a PVA film is laminated with a protective film such as a triacetyl cellulose (TAC) film in practical use for sufficient mechanical strength and sufficient moisture and heat resistance.

The counter substrate 20 is a color filter (CF) substrate that includes, in the following order from the viewing surface side to the back surface side, a transparent substrate (not illustrated), color filters/black matrix (not illustrated), and a flattening film as necessary.

The transparent substrate may be, for example, a glass substrates or a plastic substrate.

The color filters/black, matrix have a structure in which red color filters, green color filters, and blue color filters are arranged in a plane and partitioned by a black matrix. The red color filters, the green color filters, the blue color filters, and the black matrix are each made of, for example, a transparent resin containing a pigment. Typically, a combination of a red color filter, a green color filter, and a blue color filter is arranged in each pixel, and the desired color is achieved in each pixel by mixing colors of the red color filter, the green color filter, and the blue color filter while controlling the amount of light passing through the filters.

The alignment films 30 and 50 may be horizontal alignment films configured to align liquid crystal compounds in a direction substantially parallel to their surfaces or may be vertical alignment films configured to align liquid crystal compounds in a direction substantially perpendicular to their surfaces. The alignment films 30 and 50 may be photo-alignment films containing a photo-functional group and having been subjected to photo-alignment as the alignment treatment, rubbed alignment films having been subjected to rubbing as the alignment treatment, or alignment films not having been subjected to any alignment treatment.

Each of the alignment films 30 and 50 contains a first polymer containing in its main chain at least one selected from a polyamic acid structure and a polyimide structure (hereinafter, also referred to as a polyimide-based first polymer).

The polyimide-based first polymer has a diamine-derived structure and a tetracarboxylic dianhydride-derived structure as repeating structures, and is obtained by polymerizing at least one diamine and at least one tetracarboxylic dianhydride.

The polyimide-based first polymer has at least one selected from a functional group represented by the following formula (A-1) and a functional group represented by the following formula (A-2). These functional groups are initiator functional groups and thus can generate radicals when irradiated with ultraviolet light, thereby being functionable as a radical polymerization initiator. Meanwhile, these functional groups, constituting the polyimide-based first polymer, hardly dissolve in the liquid crystal layer 40, unlike common polymerization initiators and initiator monomers to be added to the liquid crystal layer in the PSA technique. Also, radicals generated from these functional groups react with monomers added to the liquid crystal layer 40, and the alignment films 30 and 50 form covalent bonds with polymers (the later-described second polymer) constituting the polymer layers 31 and 51, respectively. This can increase the formation rates of the polymer layers 31 and 51 (polymerization rate of the monomers), reducing the ultraviolet light irradiation dose for the liquid crystal layer 40 in the polymer layer formation. These can prevent a VHR decrease and a residual DC voltage increase even after long-term use of the liquid crystal display device of the present embodiment. The initiator functional groups are preferably introduced into a side chain of the polyimide-based first polymer.

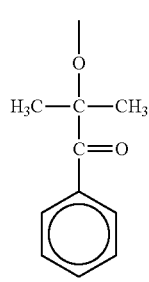

(A-1)

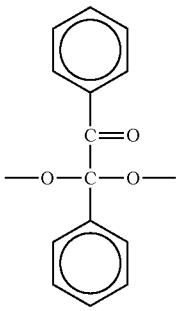

(A-2)

Figure 3:
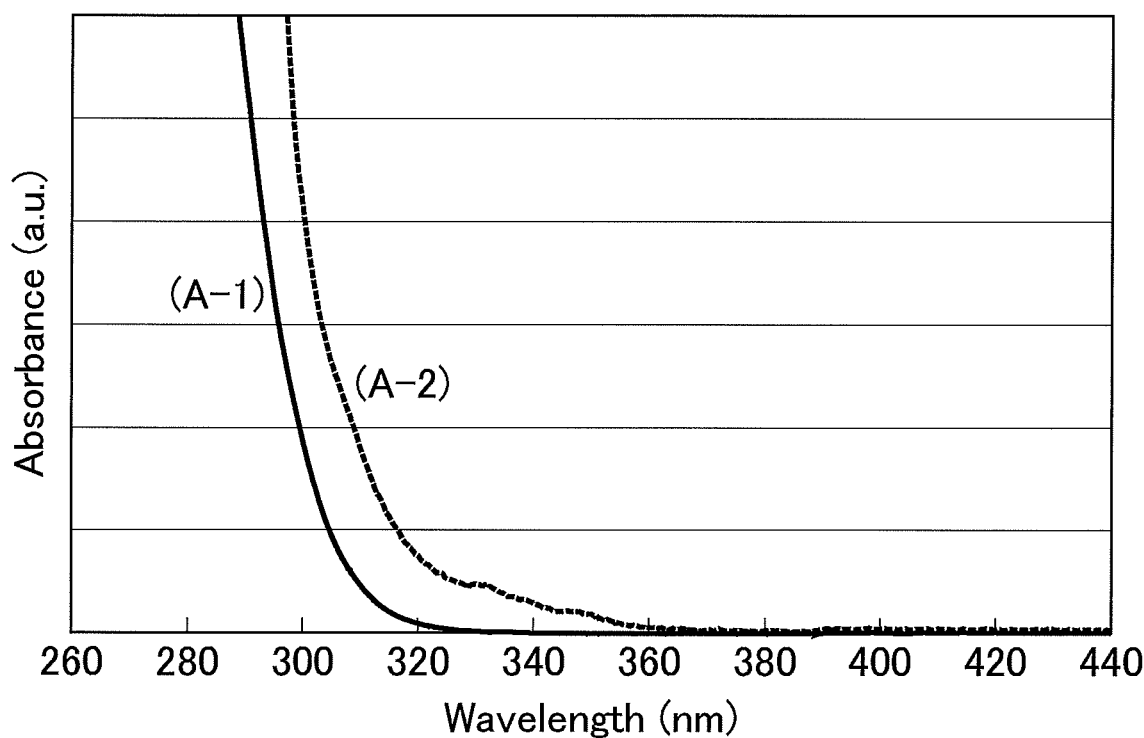
FIG. 3 is a graph of absorption spectra of a functional group represented by the formula (A-1) and a functional group represented by the formula (A-2).

FIG. 3 is a graph of absorption spectra of a functional group represented by the formula (A-1) and a functional group represented by the formula (A-2). As shown in FIG. 3, the functional group represented by the formula (A-1) has a shorter absorption wavelength than the functional group represented by the formula (A-2). For this reason, when an unreacted initiator functional group remains and the liquid crystal display device of the present embodiment is used for a long period of time, i.e., several years, the functional group represented by the formula (A-2) is likely to cleave under the backlight illumination or external light, generating radicals. In the case of a photocleavage under the backlight, illumination, radical generation is likely to start from the alignment film 50, which is closer to the backlight 80. In the case of a photocleavage under external light, radical generation is likely to start from the alignment, film 30, which is closer to the external light (i.e., the side remote from the backlight 80). Such photocleavages are presumed to cause a gradual increase in residual DC voltage. Meanwhile, the functional group represented by the formula (A-1) is not likely to cause asymmetrization due to the above radical generation even when the liquid crystal display device of the present embodiment is used for a very long period of time. The point of the present embodiment is as follows. Even when unreacted initiator functional groups are present, they are not in the liquid crystal layer 40 (since they are chemically bonded to the alignment films 30 and 50), and thus the reliability is not decreased in normal practical use. Yet, in consideration of cases where the display device is used for a very long period of time and the backlight 80 used is a high-luminance backlight, the functional group represented by the formula (A-1) is preferred to the functional group represented by the formula (A-2).

When the functional group represented by the formula (A-1) is introduced into a side chain of the polyimide-based first polymer, the binding site (—O— group) with the side chain or main chain and the phenyl group are positioned linearly, so that the side chain containing the functional group represented by the formula (A-1) does not become bulky. This technique therefore eliminates the need to consider the influence on introduction and the introduction ratio of another side chain (e.g., vertical alignment functional group, photo-functional group). In contrast, when the functional group represented by the formula (A-2) is introduced into a side chain of the polyimide-based first polymer, the binding site (—O— group) with the side chain or main chain and the two phenyl groups form a bent shape (become perpendicular to each other), so that the side chain containing the functional group represented by the formula (A-2) becomes bulky. This may inhibit introduction of another side chain (e.g., vertical alignment functional group, photo-functional group). In the case where another side chain is difficult to introduce due to its chemical structure, the molecular structure design of the alignment films 30 and 50 may be limited.

The polyimide-based first polymer preferably has at least one photo-functional group, more preferably at least one photo-functional group selected from the group consisting of a cinnamate group, an azobenzene group, a chalcone group, and a coumarin group, each of which may contain a substituent.

Preferred examples of the substituent include, but are not limited to, a halogen group, a methyl group, a methoxy group, an ethyl group, and an ethoxy group. These may be used alone or in combination with each other. In other words, the substituent preferably includes at least one substituent selected from the group consisting of a halogen group, a methyl group, a methoxy group, an ethyl group, and an ethoxy group. The halogen group is preferably a fluoro group or a chloro group. In the case where the photo-functional group contains a substituent, the substituent usually replaces at least one hydrogen atom in a ring structure, such as a phenylene group, of the photo-functional group. The photo-functional group may be a monovalent functional group, but is preferably a divalent cinnamate group represented by the following formula (B-1), a divalent azobenzene group represented by the following formula (B-2), a divalent chalcone group represented by the following formula (B-3), or a divalent coumarin group represented by the following formula (B-4).

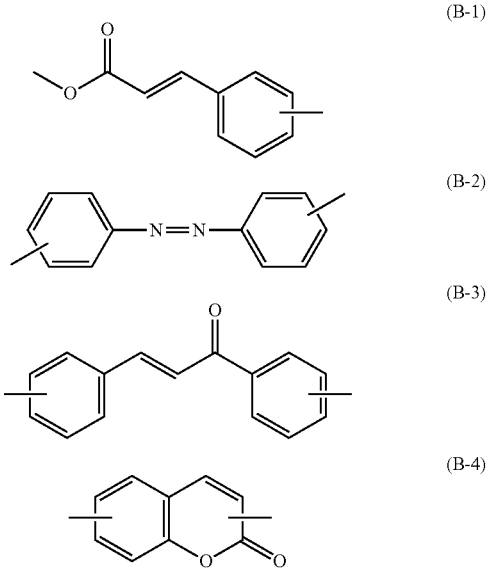

Preferred examples of the polyimide-based first-polymer include polyamic acid structures represented by the following formula (C-1) or (C-2) (the polyamic acid structures may be at least partially imidized into polyimide structures). These may be used alone or in combination with each other.

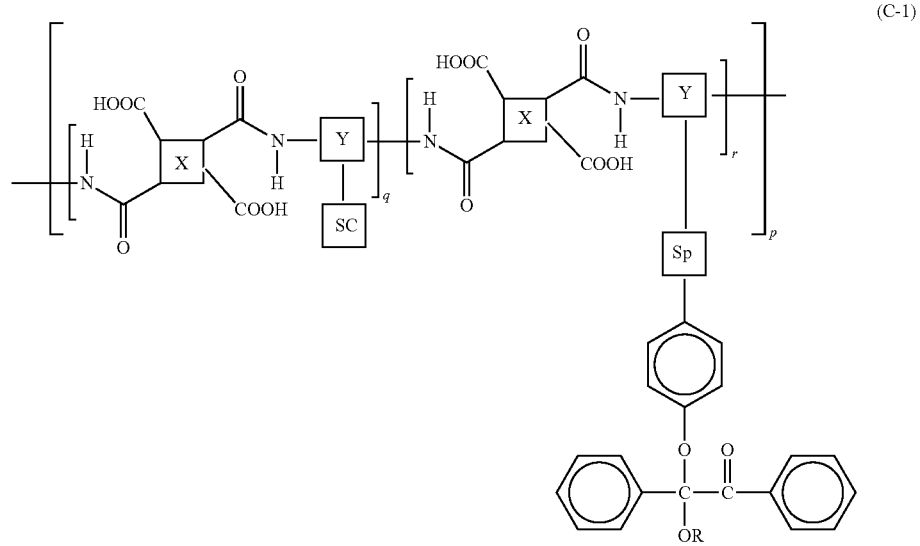

In the formula, X represents a tetravalent organic group, Y represents a trivalent organic group, SC represents a side chain, Sp represents a spacer or a direct bond, R represents a monovalent organic group, p represents a degree of polymerization, p, q, and r are each independently an integer of 1 or greater, p is preferably 10 or greater, and q and r satisfy the relation $0 < r/(q+r) \leq 1$.

Specific examples of R in the formula (C-1) include methyl, ethyl, propyl, isopropyl, butyl, and isobutyl groups. These may be used alone or in combination with each other.

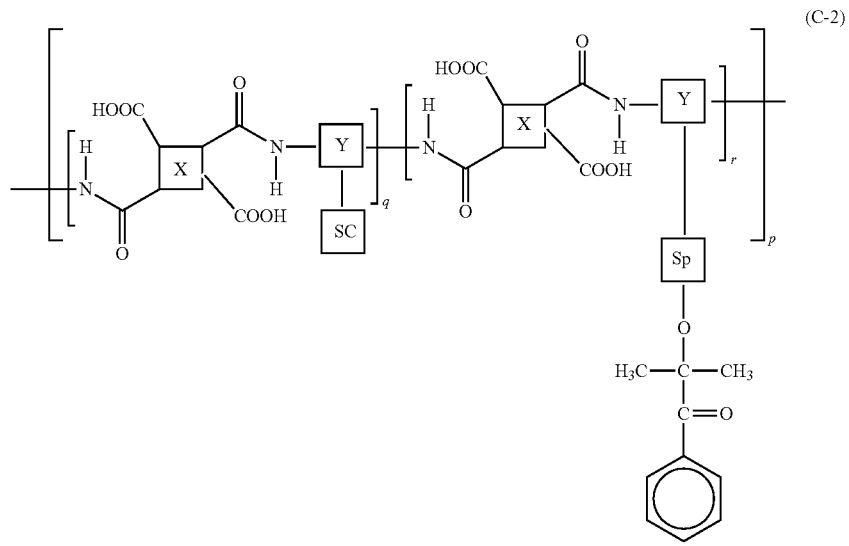

In the formula, X represents a tetravalent organic group, Y represents a trivalent organic group, SC represents a side chain, Sp represents a spacer or a direct bond, p represents a degree of polymerization, p, q, and r are each independently an integer of 1 or greater, p is preferably 10 or greater, and q and r satisfy the relation $0 < r/(q+r) \le 1$.

In the case where the alignment films 30 and 50 are vertical alignment films (in the vertical alignment mode), q and r in the formulas (C-1) and (C-2) preferably satisfy the relation $0 < r/(q+r) \le 0.5$, more preferably the relation $0 < r/(q+r) \le 0.4$. In the case where the alignment films 30 and 50 are horizontal alignment films (in the horizontal alignment mode), q and r in the formulas (C-1) and (C-2) are not limited as long as they satisfy the relation $0 \le r/(q+r) \le 1$.

In the formulas (C-1) and (C-2), in the case where X contains a photo-functional group, X may be, for example, a group represented by any of the following formulas (X-1) to (X-4). These groups can be used both in the case where the alignment films 30 and 50 are horizontal alignment films and in the case where the alignment films 30 and 50 are vertical alignment films. These groups may be used alone or in combination with each other.

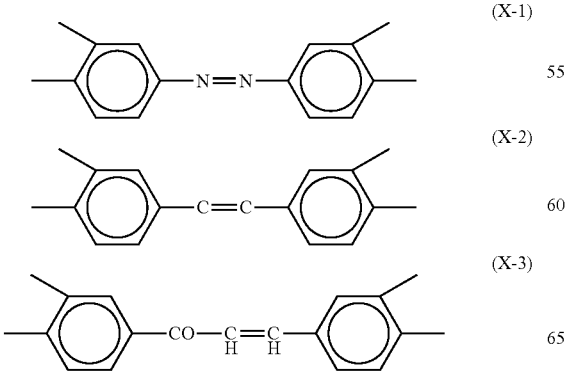

-continued

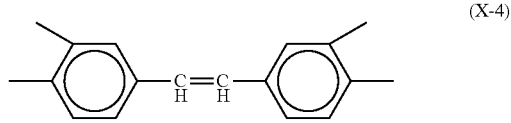

In the formulas (C-1) and (C-2), in the case where X contains no photo-functional group, X may be, for example, a group represented by any of the following formulas (X-5) to (X-16). These groups can be used both in the case where the alignment films 30 and 50 are horizontal alignment films and in the case where the alignment films 30 and 50 are vertical alignment films. These groups may be used alone or in combination with each other.

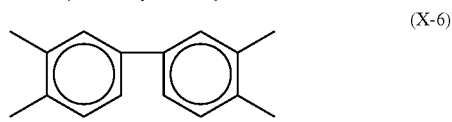

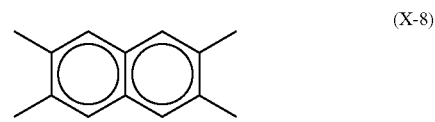

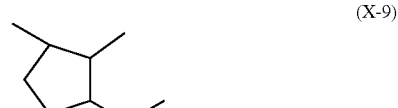

-continued

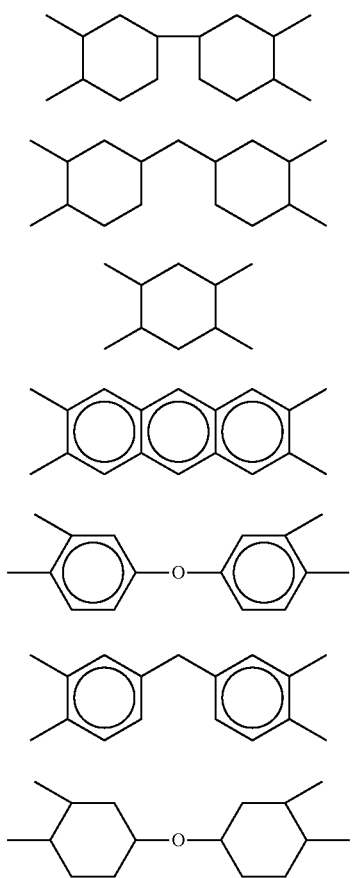

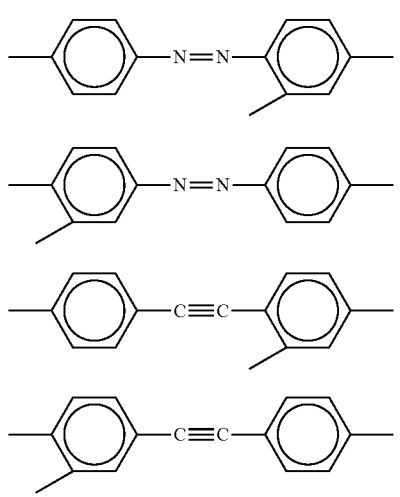

In the formulas (C-1) and (C-2), in the case where Y contains a photo-functional group, Y may be, for example, a group represented by any of the following formulas (Y-1) to (Y-8). These groups can be used both in the case where the alignment films 30 and 50 are horizontal alignment films and in the case where the alignment films 30 and 50 are vertical alignment films. These groups may be used alone or in combination with each other.

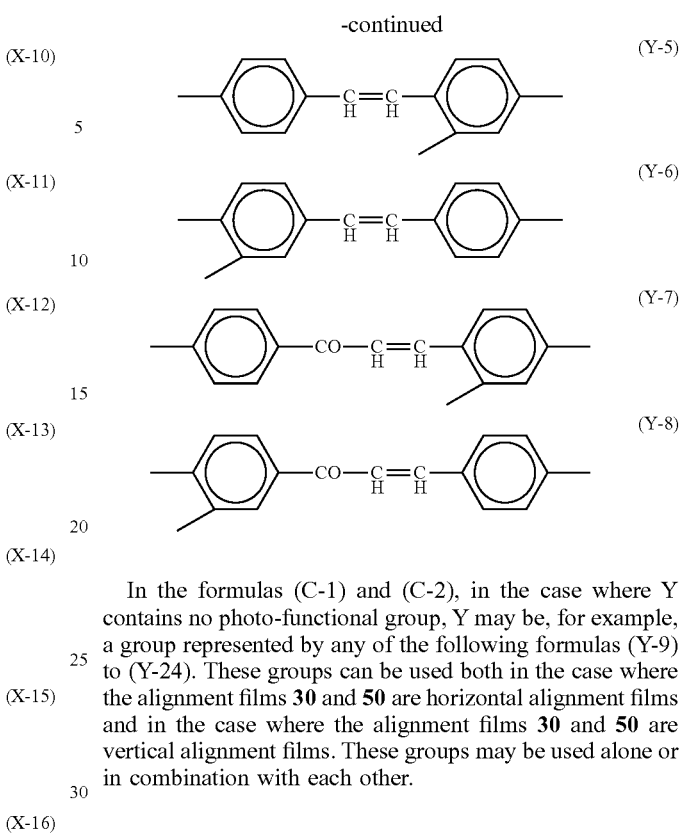

In the formulas (C-1) and (C-2), in the case where Y contains no photo-functional group, Y may be, for example, a group represented by any of the following formulas (Y-9) to (Y-24). These groups can be used both in the case where the alignment films 30 and 50 are horizontal alignment films and in the case where the alignment films 30 and 50 are vertical alignment films. These groups may be used alone or in combination with each other.

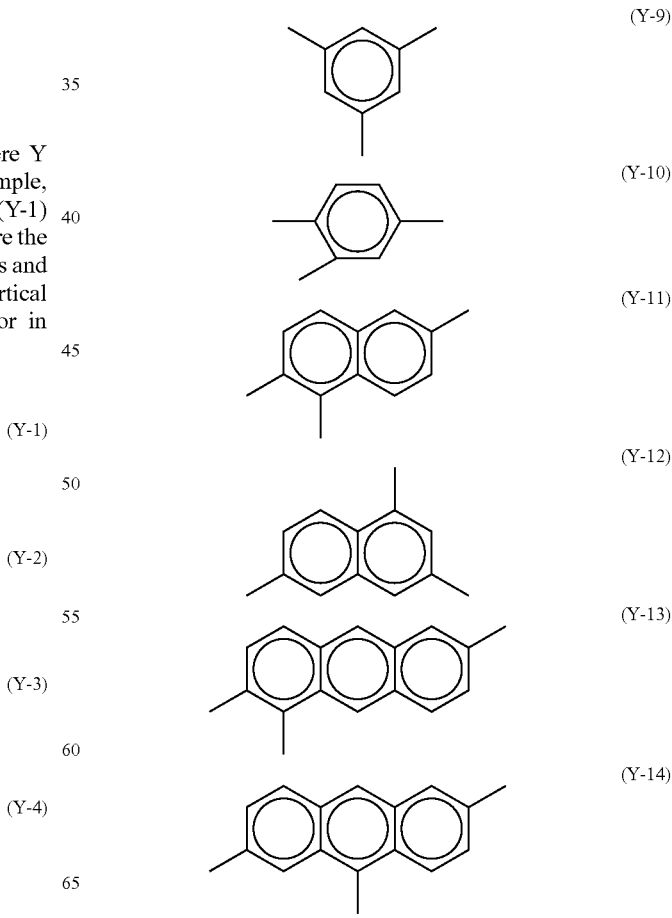

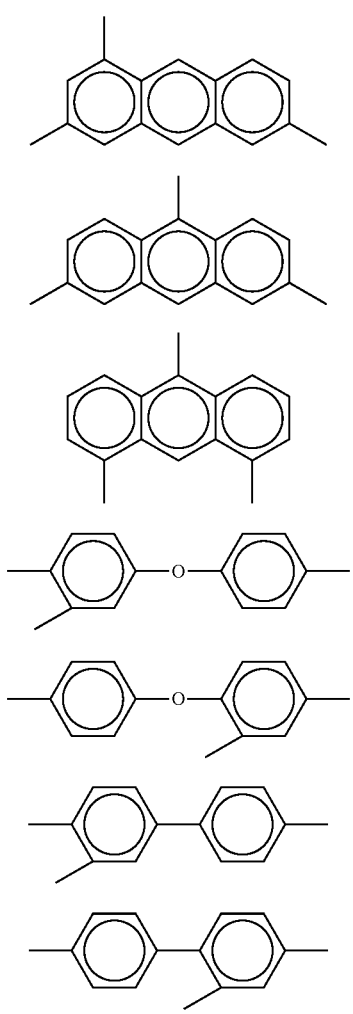

(Y-15)
(Y-16)
(Y-17)
(Y-18)
(Y-19)
(Y-20)
(Y-21)

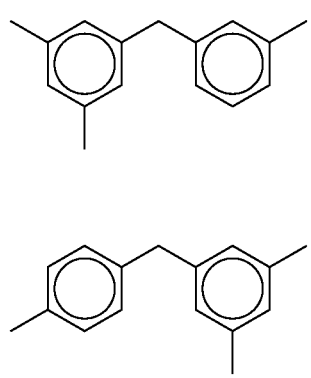

(Y-22)
(Y-23)
(Y-24)

In the case where the alignment films 30 and 50 are photo-alignment films, the SC (side chain) in the formulas (C-1) and (C-2) preferably contains a photo-functional group. Preferred examples of the photo-functional group include monovalent groups represented by any of the following formulas (SC-1) to (SC-6). The groups represented by any of the formulas (SC-1) to (SC-3) can be used in the case where the alignment films 30 and 50 are horizontal alignment films. These groups may be used alone or in combination with each other. The groups represented by any of the formulas (SC-4) to (SC-6) can be used in the case where the alignment films 30 and 50 are vertical alignment films. These groups may be used alone or in combination with each other.

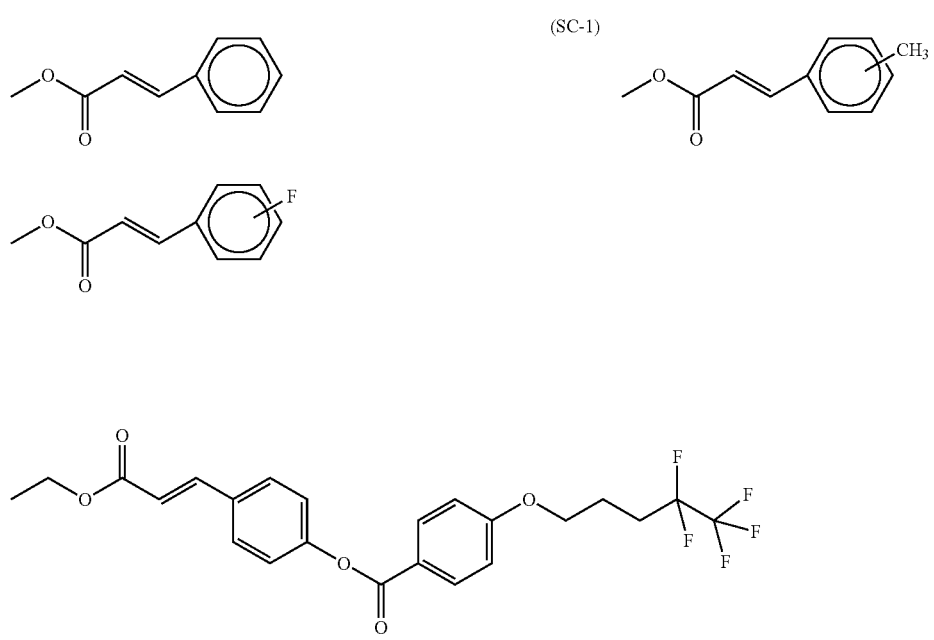

(SC-1)
(SC-2)
(SC-3)
(SC-4)

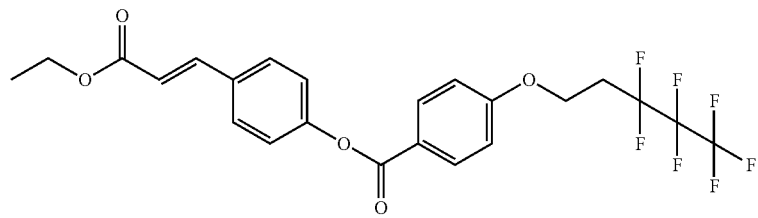
(SC-5)

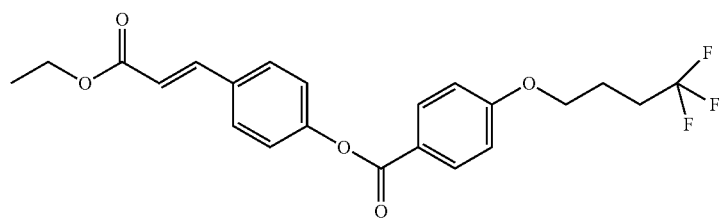
(SC-6)

In the case where the alignment films 30 and 50 are not photo-alignment films, the SC (side chain) in the formulas (C-1) and (C-2) may contain a horizontal alignment functional group other than a photo-functional group, such as a monovalent group represented by any of the following formulas (SC-7) to (SC-13). Also, the SC (side chain) may be excluded and a hydrogen atom (hydrogen group) may be bonded to Y. These groups can be used in the case where the alignment films 30 and 50 are horizontal alignment films. These groups may be used alone or in combination with each other.

—CH₃ (SC-7)

—C₂H₅ (SC-8)

—CF₃ (SC-9)

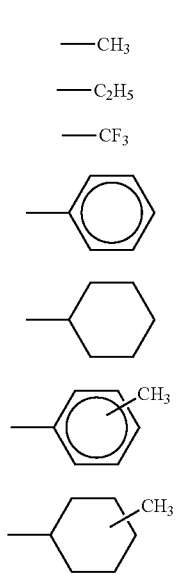

(SC-10)

(SC-11)

(SC-12)

(SC-13)

In the case where the alignment films 30 and 50 are not photo-alignment films, the SC (side chain) in the formulas (C-1) and (C-2) may contain a vertical alignment functional group other than a photo-functional group, such as a monovalent group represented by any of the following formulas (SC-14) to (SC-20). These groups can be used in the case where the alignment films 30 and 50 are vertical alignment films. These groups may be used alone or in combination with each other.

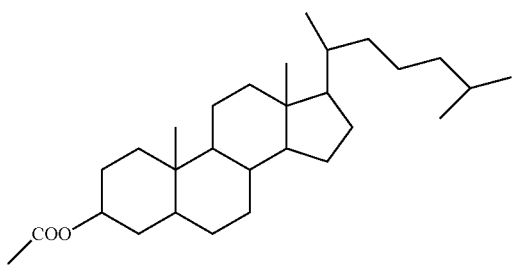
(SC-14)

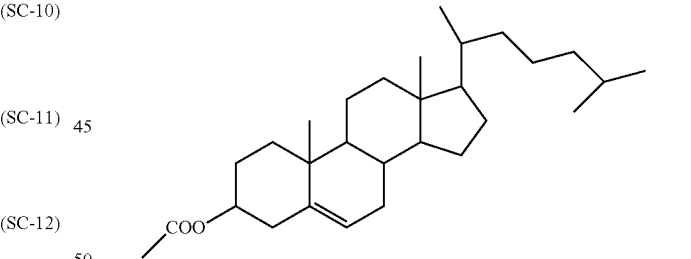
(SC-15)

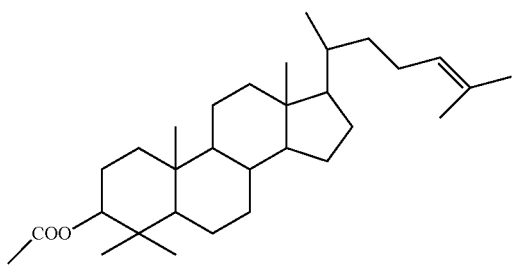
(SC-16)

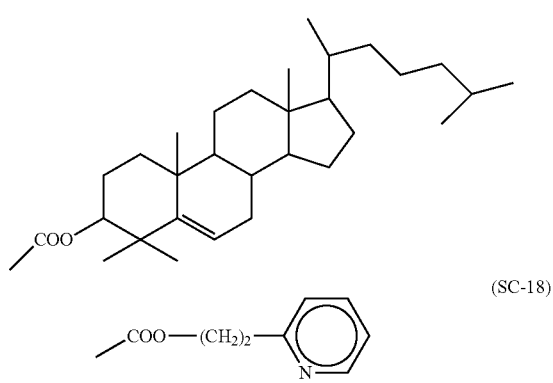
(SC-17)
(SC-18)
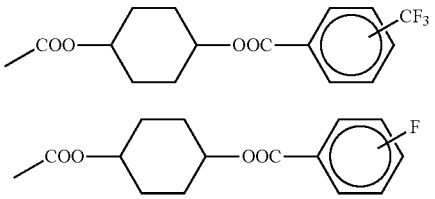
(SC-19)
(SC-20)
Particularly preferred examples of the polyimide-based first polymer include polyamic acid structures represented by any of the following formulas (C-1-1) and (C-2-1) (the polyamic acid structures may be at least partially imidized into polyimide structures). These may be used alone or in combination with each other.
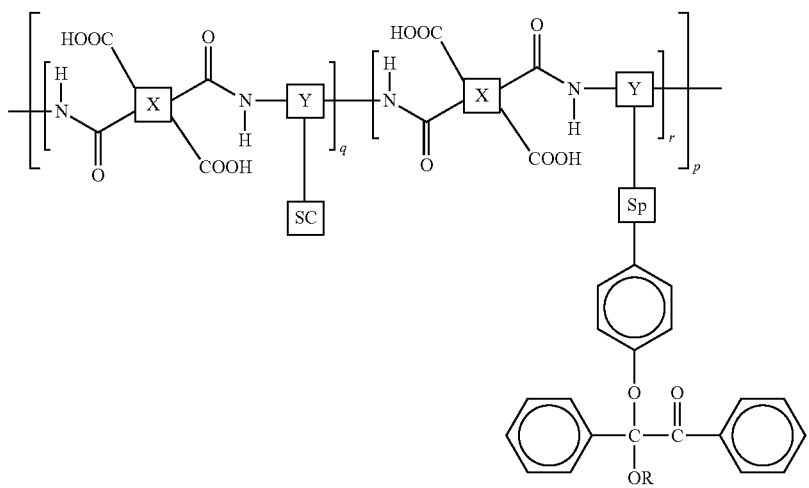
(C-1-1)
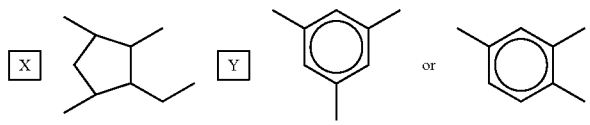
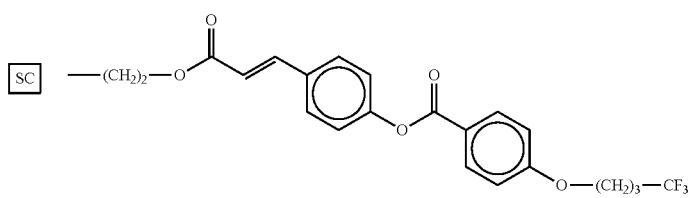

In the formula, Sp represents a spacer or a direct bond, p represents a degree of polymerization, p, q, and r are each independently an integer of 1 or greater, p is preferably 10 or greater, and q and r satisfy the relation $0<r/(q+r)\leq 1$ (in the case of the vertical alignment mode, preferably the relation $0<r/(q+r)\leq 0.5$, more preferably the relation $0<r/(q+r)\leq 0.4$).

Specific examples of R in the formula (C-1-1) include methyl, ethyl, propyl, isopropyl, butyl, and isobutyl groups. These may be used alone or in combination with each other.

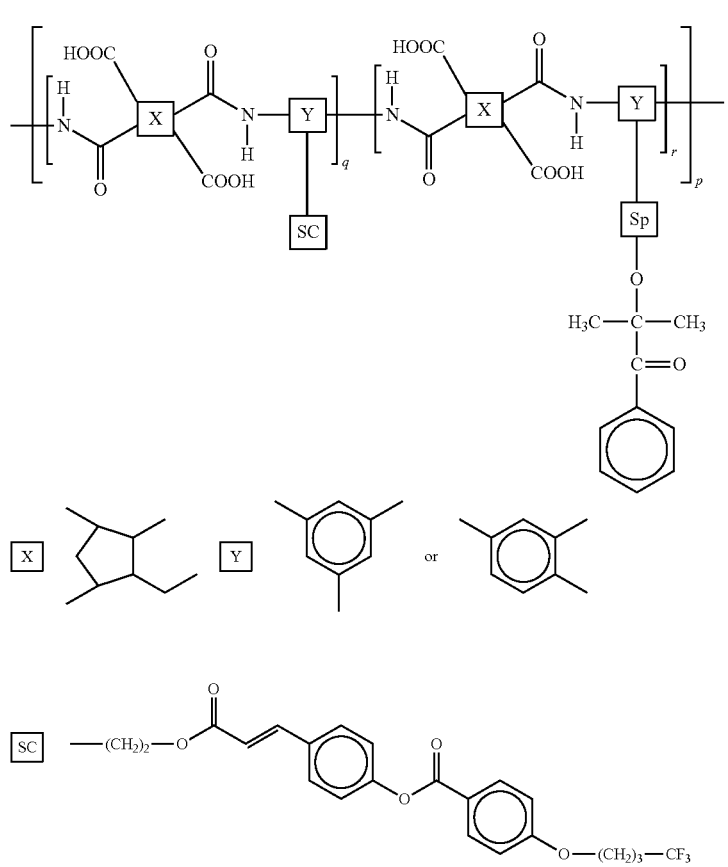

In the formula, Sp represents a spacer or a direct bond, p represents a degree of polymerization, p, q, and r are each independently an integer of 1 or greater, p is preferably 10 or greater, and q and r satisfy the relation $0<r/(q+r)\leq 1$ (in the case of the vertical alignment mode, preferably the relation $0<r/(q+r)\leq 0.5$, more preferably the relation $0<r/(q+r)\leq 0.4$).

For a high contrast ratio, the alignment films 30 and 50 are preferably photo-alignment films. In the case where the alignment films 30 and 50 each contain a structure represented by the formula (C-1) and/or the formula (C-2), the alignment films 30 and 50 are made into photo-alignment films by introducing a photo-functional group into at least one selected from X, Y, and SC (side chain).

Each of the polymer layers 31 and 51 contains a second polymer obtained by polymerizing at least one monomer including at least one monomer represented by the following formula (1) (hereinafter, also referred to as the monomer (1)). As described above, a polymer of the monomer (1) is likely to separate from the liquid crystal layer 40, which means that use of the monomer (1) enables easy formation of the polymer layers 31 and 51, reducing the ultraviolet light irradiation dose for the liquid crystal layer 40 in the polymer layer formation. This also contributes to maintenance of the VHR and reduction of residual DC voltage generation in long-term use. Also, since polarized ultraviolet light application imparts alignability to the monomer (1), use of the monomer (1) and application of polarized ultraviolet light (this process requires heating at the Tni of the liquid crystal material or higher) enable formation of the polymer layers 31 and 51 capable of achieving the horizontal alignment. The liquid crystal display device of the present embodiment may therefore be in the vertical alignment mode, but is preferably in the horizontal alignment mode. Each of the polymer layers 31 and 51 preferably align liquid crystal compounds in the liquid crystal layer 40 in the direction parallel to the surfaces of the substrates 20 and 60. Aligning liquid crystal compounds in the liquid crystal layer 40 in the direction parallel to the surfaces of the substrates 20 and 60 means that the pre-tilt angle of the liquid crystal material from the surfaces of the substrates 20 and 60 is 0° or greater and 5° or smaller, preferably 0° or greater and 3° or smaller. The second polymer may include monomer (1)-derived units as main units or may be composed of the monomer (1)-derived units alone. At least some molecules of the second polymer in each of the polymer layers 31 and 51 are covalently bonded through a reaction to the functional group represented by the formula (A-1) (and radicals thereof) or the functional group represented by the formula (A-2) (and radicals thereof).

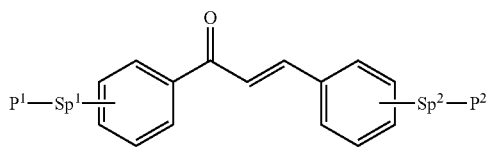

(1)

In the formula, $P^1$ and $P^2$ are the same as or different from each other, and each represent an acryloyloxy, methacryloyloxy, acryloylamino, methacryloylamino, vinyl, or vinyloxy group, $Sp^1$ and $Sp^2$ are the same as or different from each other, and each represent a C1-C6 linear, branched, or cyclic alkylene or alkyleneoxy group, or a direct bond, and at least one hydrogen atom in each phenylene group may be replaced.

In the formula (1), at least one hydrogen atom of each phenylene group may be replaced by a halogen atom (preferably a fluorine or chlorine atom), or a methyl, methoxy, ethyl, or ethoxy group.

Specific preferred examples of the monomer (1) include monomers represented by any of the following formulas (2-1) and (2-2). These may be used alone or in combination with each other.

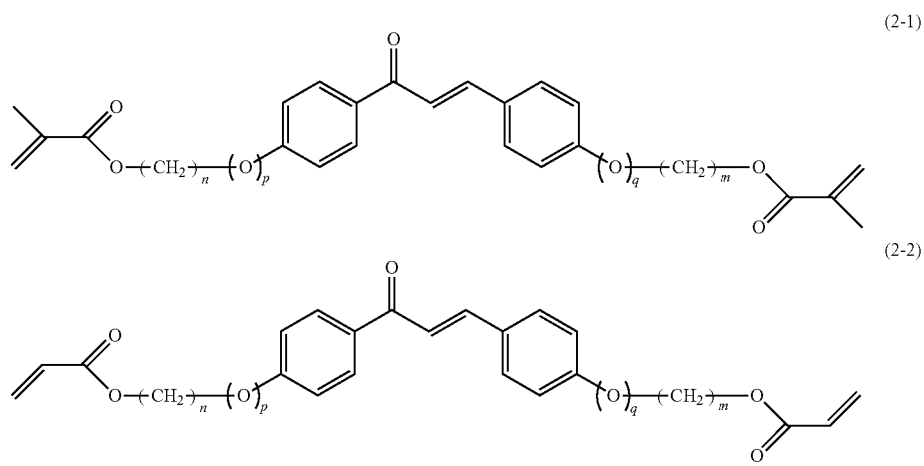

In the formulas, p and q are the same as or different from each other, and each 0 or 1, and m and n are the same as or different from each other, and each an integer of 0 to 6.

More specific preferred examples of the monomer (1) include monomers represented by any of the following formulas (3-1) to (3-8). These may be used alone or in combination with each other.

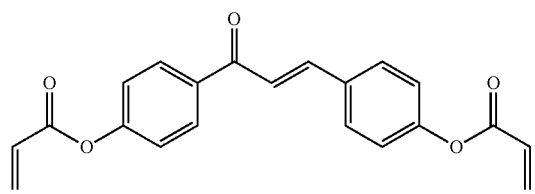

(3-1)

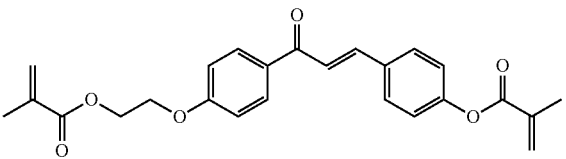

(3-2)

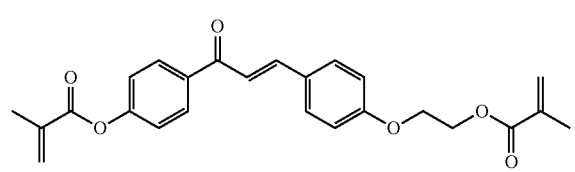

(3-3)

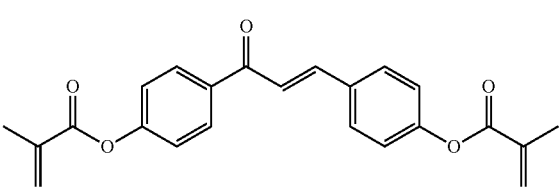

(3-4)

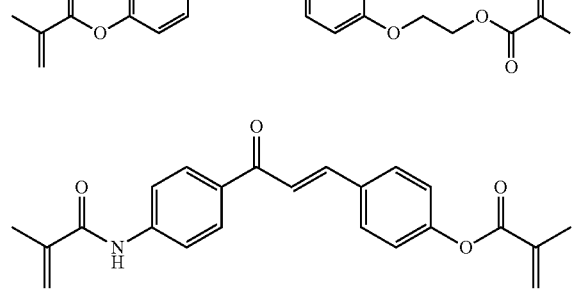

(3-5)

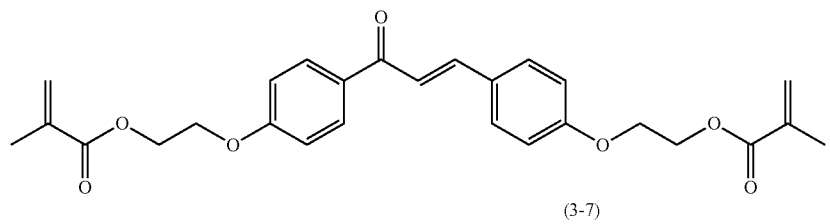

(3-6)

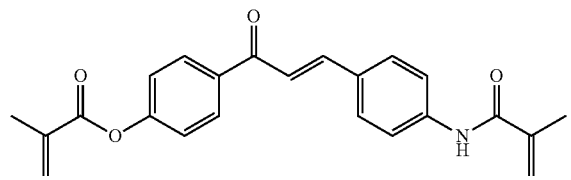

(3-7)

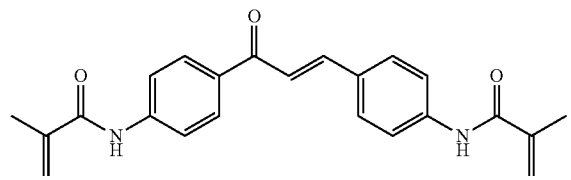

(3-8)

The liquid crystal layer 40 contains a liquid crystal material (nematic liquid crystal) containing at least one liquid crystal compound (liquid crystal molecules) and exhibiting a nematic phase. The liquid crystal material transforms from the nematic phase into an isotropic phase when the temperature being increased from the nematic temperature reaches a certain critical temperature (nematic-isotropic phase transition temperature (Tni)). The nematic-isotropic phase transition temperature of the liquid crystal material may be any temperature, such as a temperature of 70° C. to 110° C. The Tni is that, of the liquid crystal material before the above monomer is added. The liquid crystal layer 40 contains liquid crystal compounds aligned in a predetermined direction with no voltage applied. The predetermined direction (initial alignment direction) is appropriately determined according to the liquid crystal driving mode. For example, in the horizontal alignment mode, the liquid crystal compounds are aligned in a direction substantially parallel to a main surface of each of the substrates 20 and 60 with no voltage applied. In the vertical alignment mode, the liquid crystal compounds are aligned in a direction substantially perpendicular to the main surface of each of the substrates 20 and 60 with no voltage applied.

The anisotropy of dielectric constant ($\Delta\varepsilon$) represented by the following formula of the liquid crystal material and the liquid crystal compound may be positive or negative. The liquid crystal material may also contain a liquid crystal compound having no polarity, i.e., having an anisotropy $\Delta\varepsilon$ of substantially 0 (neutral liquid crystal compound). Examples of the neutral liquid crystal compound include liquid crystal compounds having an alkene structure.

$\Delta\varepsilon$=(dielectric constant in major axis direction)−(dielectric constant in minor axis direction)

The thin-film transistor (TFT) substrate 60 can be an active matrix substrate usually used in the field of liquid crystal display panels. The liquid crystal driving mode for the liquid crystal display device of the present, embodiment may be any mode such as the twisted nematic (TN) mode, the electrically controlled birefringence (ECB) mode, a horizontal alignment mode including the FFS mode and the IPS mode, or a vertical alignment mode including the 4D-RTN mode and the multi-domain vertical alignment (MVA) mode.

In the case where the liquid crystal driving mode of the liquid crystal display device of the present embodiment is the FFS mode, the TFT substrate 60 includes, for example, a supporting substrate, a common electrode (planar electrode) disposed on the liquid crystal layer 40 side of the supporting substrate, an insulating film covering the common electrode, and pixel electrodes (comb electrodes) disposed on the liquid crystal layer 40 side of the insulating film. This structure can generate horizontal electric fields (fringe electric fields) in the liquid crystal layer 40 by applying voltage between the common electrode and the pixel electrodes constituting a pair of electrodes. Thus, controlling the voltage applied between the common electrode and the pixel electrodes enables control of the alignment of the liquid crystals in the liquid crystal layer 40.

In the case where the liquid crystal driving mode for the liquid crystal display device of the present embodiment is the IPS mode, the liquid crystal display device applies voltage to the pair of comb electrodes disposed in the TFT substrate 60 to generate horizontal electric fields in the liquid crystal layer 40, thereby controlling the alignment of the liquid crystals in the liquid crystal layer 40.

In the case where the liquid crystal driving mode for the liquid crystal display device of the present embodiment is the vertical alignment mode, the TFT substrate 60 includes pixel electrodes, and the counter substrate 20 includes a common electrode. The liquid crystal display device applies voltage between the common electrode and the pixel electrodes to generate vertical electric fields in the liquid crystal layer 40, thereby controlling the alignment of the liquid crystals in the liquid crystal layer 40. In the 4D-RTN mode, the alignment films 30 and 50 are subjected to alignment treatment in opposite (antiparallel) directions in each pixel, and the TFT substrate 60 and the counter substrate 20 are bonded to each other such that the alignment treatment directions for the alignment films 30 and 50 are perpendicular to each other. This can define four alignment directions (domains), which are different from each other, in each pixel. In the MVA mode, alignment control structures such as ribs and slits are provided to the TFT substrate 60 and the counter substrate 20 to define different alignment directions (domains) in each pixel.

The second linear polarizer 70 can be the same polarizer as that used for the first linear polarizer 10. The transmission axis of the first linear polarizer 10 and the transmission axis of the second linear polarizer 70 are preferably perpendicular to each other. This configuration sets the first linear polarizer 10 and the second linear polarizer 70 in crossed Nicols, achieving a favorable black display state with no voltage applied.

The backlight 80 may be of any type and may be, for example, an edge-lit backlight or a direct-lit backlight. The backlight 80 may utilize any light source such as a light emitting diode (LED) or a cold cathode fluorescent lamp (CCFL). The amount of light, emitted from the backlight 80 and transmitted by the light crystal panel is controlled by the voltage applied to the liquid crystal layer 40.

The liquid crystal display device of Embodiment 1 may include any other members. For example, with an anti-reflection film disposed on the viewing surface side of the first linear polarizer 10, the reflectance of the liquid crystal panel can be further decreased. The anti-reflection film is preferably a moth-eye film having a surface structure like a moth's eye.

The method for producing the liquid crystal display device of the present embodiment is described.

First, the counter substrate 20 and the TFT substrate 60 are produced by common methods to prepare the counter substrate 20 and the TFT substrate 60 as a pair of substrates (preparation process).

The preparation is followed by applying an alignment agent containing a first polymer (polyimide-based first polymer) containing in its main chain at least one selected from a polyamic acid structure and a polyimide structure to the surface of each of the substrates 20 and 60 so as to form an alignment film (film forming process). Specifically, an alignment film agent is prepared by dissolving a polyimide-based first polymer containing at least one selected from the functional group represented by the formula (A-1) and the functional group represented by the formula (A-2) in a solvent (for example, organic solvent). To the surface of each of the substrates 20 and 60 is applied the alignment agent by a method such as roll coating, spin coating, printing, or ink jetting. The surface of each of the substrates 20 and 60 is heated to volatilize the solvent in the alignment agent, whereby the alignment films 30 and 50 are formed. The heating may include two processes of pre-baking and post-baking. The post-baking may include two processes, so that a total of three heating processes may be performed. In the case of using the polyimide-based first polymer, the post-baking may involve partial imidization of a polyamic acid structure into a polyimide structure.

Thereafter, the alignment films 30 and 50 may or may not be subjected to alignment treatment. Examples of the alignment treatment include rubbing and photoalignment treatments such as ultraviolet light irradiation. In a typical horizontal alignment mode, the horizontal alignment films are subjected to an alignment treatment. In the present embodiment employing the monomer (1), the alignment treatment in this process may be omitted. Even without the alignment treatment, irradiating the liquid crystal layer 40 with polarized ultraviolet light in the later-described polymer layer formation enables formation of the polymer layers 31 and 51 capable of achieving the horizontal alignment.

Between the substrates 20 and 60 having formed thereon the alignment films 30 and 50, respectively, is formed the liquid crystal layer 40 by sealing a liquid crystal composition containing a liquid crystal material and at least one monomer (hereinafter, also referred to as an additional monomer) including at least one monomer represented by the formula (1) (monomer (1)) (liquid crystal layer formation). The liquid crystal layer formation is achieved by vacuum filling or one drop filling. The amount of the additional monomer to be introduced is preferably 1 to 30 wt %, more preferably 5 to 25 wt %, relative to the whole liquid crystal composition. The additional monomer may include the monomer (1) as a main monomer or may be composed of the monomer (1) alone. In the case of employing the vacuum filling, processes are performed in the following order: application of a sealant; bonding of the substrates 20 and 60; curing of the sealant; injection of the liquid crystal composition; and sealing of the injection ports. In the case of employing the one drop filling, processes are performed in the following order: application of a sealant; dropping of the liquid crystal composition; bonding of the substrates 20 and 60; and curing of the sealant. These result in a liquid crystal cell filled with the liquid crystal material.

The liquid crystal layer 40 between the substrates 20 and 60 is then heated to transform the liquid crystal material into an isotropic phase (isotropic phase treatment). The heating temperature here may be any temperature higher than the nematic-isotropic phase transition temperature of the liquid crystal material and is, for example, 80° C. to 150° C. The heating duration is, for example, 30 to 60 minutes. The isotropic phase treatment is followed by cooling the liquid crystal cell to room temperature.

After the isotropic phase treatment, the liquid crystal layer 40 is irradiated with ultraviolet light to form the polymer layers 31 and 51 from the second polymer obtained by polymerizing the additional monomer including the monomer (1) between the liquid crystal layer 40 and the alignment films 30 and 50 (polymer layer formation), respectively. The ultraviolet light applied is preferably polarized ultraviolet light, more preferably linearly polarized ultraviolet light, in the case of the horizontal alignment mode, and is preferably unpolarized ultraviolet light in the case of the vertical alignment mode.

The ultraviolet light may have a wavelength of 200 to 430 nm. The lower limit of the wavelength is more preferably 250 nm, and the upper limit is more preferably 380 nm. The ultraviolet light may be applied with an irradiation dose of 0.3 to 20 $J/cm^2$. The lower limit of the irradiation dose is more preferably 1 $J/cm^2$, and the upper limit is more preferably 5 $J/cm^2$.

In the case of the horizontal alignment mode, the polymer layer formation preferably includes applying polarized ultraviolet light while heating the liquid crystal layer 40 at a temperature equal to or higher than the Tni of the liquid crystal material. This can prevent the liquid crystal material in the liquid crystal layer 40 from changing the state of the applied polarized ultraviolet light, successfully achieving the horizontal alignment of the liquid crystal compounds. The lower limit of the heating temperature is Tni+3° C. or higher. The upper limit of the heating temperature is preferably Tni+20° C. or lower for minimization of heat deterioration of the liquid crystal material.

In the case of the vertical alignment mode, the polymer layer formation may include applying unpolarized ultraviolet rays while applying voltage (for example, 4 to 10 V) to the liquid crystal layer 40.

Performing the polymer layer formation after the liquid crystal layer formation enables bonding of the substrates 20 and 60, holding the liquid crystal layer 40 in between, to each other with the sealant and formation of the polymer layers 31 and 51 in a region surrounded by the sealant in a plan view.

The above processes are followed by bonding of polarizers and mounting of members such as a controller, a power source, and a backlight. Thereby, the liquid crystal display device of the present embodiment is completed.

An embodiment of the present invention was described above. Each and every feature of the embodiment is applicable to all the aspects of the present invention.

The present invention is described in more detail below based on examples and comparative examples. The examples, however, are not intended to limit the scope of the present invention.

Synthesis Example 1

The following shows an exemplary synthesis of a diamine monomer containing a 2-hydroxy-2-methyl-1-phenyl-propan-1-on functional group in a side chain.

Process A

An amount of 3 g of dinitrophenyl acetate (13.3 mmol, compound (1)) was dissolved in 8 mL of SOLMIX AP-I, followed by addition of 0.06 g of Raney Ni to the solution. The mixture was fed into an autoclave. The system was purged with hydrogen and left to stand overnight at room temperature under a pressure of 0.4 MPa. High performance liquid chromatography (HPLC) was used to confirm that the reaction was completed, and then the reaction liquid was filtered through Celite. The filtrate was concentrated until no filtrate was observed. The thus-obtained crude liquid was distilled under reduced pressure, so that 1.98 g of 2,4-diaminophenyl acetate (2) (11.9 mmol, yield: 90%) was obtained. Then, 1.8 g of the compound (2) (10.8 mmol) was dissolved in 5 mL of acetone, followed by dropwise addition of t-butoxycarbonyl anhydride (5 g/THF 5 mL) into the solution. The resulting mixture was heated to the reflux temperature and left to stand overnight. After the completion of the reaction, the reaction liquid was concentrated and dried, whereby a Boc compound (3) (3.73 g, 10.2 mmol, yield: 94%) was obtained.

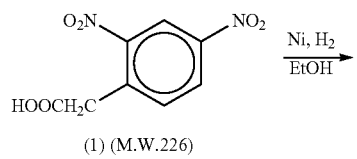

(1) (M.W.226)

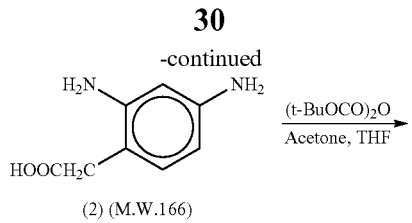

(2) (M.W.166)

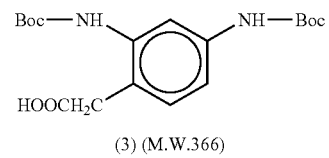

(3) (M.W.366)

Process B

Into a benzene solution (30 mL) containing 3.5 g (9.56 mmol) of the Boc compound (3) was dropwise added thionyl chloride, so that an acid chloride compound represented by the following formula (4) (3.42 g, 8.89 mmol, yield: 93%) was synthesized. Into a benzene solution (30 mL) containing 1.65 g (10 mmol) of ethyl 4-hydroxybenzoate represented by the following formula (5) and 1.5 g (15 mmol) of triethylamine was dropwise added a benzene solution (20 mL) containing 3.3 g (8.5 mmol) of the acid chloride compound represented by the following formula (4) at room temperature in a nitrogen atmosphere. The mixture was reacted for two hours at room temperature. After completion of the reaction, impurities were extracted with water, and the residue was purified by column chromatography (toluene/ethyl acetate (4/1)), whereby 4.11 g of the target compound represented by the following formula (6) was obtained (yield: 80%).

Process C

Into a THF/methanol mixed solution (20 mL) containing 2.57 g (5 mmol) of a compound represented by the formula (6) was dropwise added a sodium hydroxide aqueous solution and then hydrochloric acid. The resulting mixture was stirred for one hour, so that a carboxylic acid compound represented by the following formula (7) was synthesized (2.33 g, 4.8 mmol).

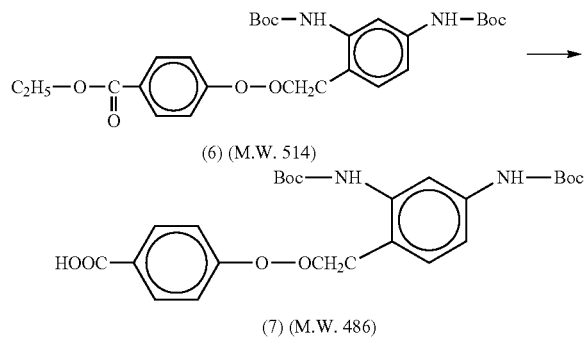

(6) (M.W. 514)

(7) (M.W. 486)

Process D

Thionyl chloride was dropwise added into a benzene solution (30 mL) containing 2.19 g (4.5 mmol) of a compound represented by the formula (7), so that an acid chloride compound (2.24 g, 4.3 mmol, yield: 96%) was synthesized. Into a benzene solution (30 mL) containing 0.82 g (5 mmol) of 2-hydroxy-2-methyl-1-phenyl-propan-1-on represented by the following formula (8) and 1.5 g (15 mmol) of triethylamine was dropwise added a benzene solution (20 mL) containing 2.24 g (4.3 mmol) of an acid chloride compound represented by the following formula (7) at room temperature in a nitrogen atmosphere. The mixture was reacted for two hours at room temperature. After completion of the reaction, impurities were extracted with water, and the residue was purified by column chromatography (toluene/ethyl acetate (4/1)), whereby 2.26 g of the target compound represented by the following formula (9) (3.57 mmol, yield: 83%) was obtained.

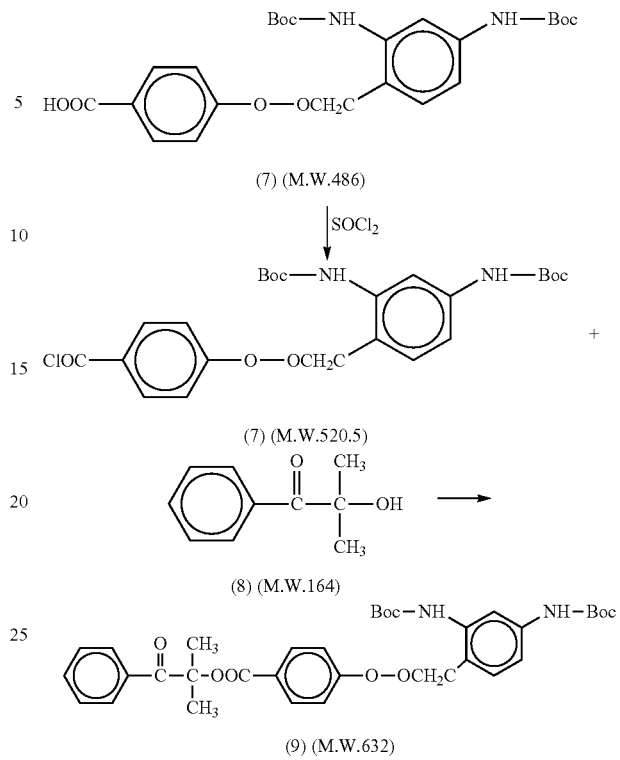

Process E

The compound (9) was dissolved in methylene chloride, followed by adding tin(II) trifluoromethanesulfonate (Sn(OTf)$_2$) in portions to the solution at 0° C. The mixture was reacted at room temperature, and then neutralized with 5% NaHCO$_3$aq. The mixture was washed with water until it had a neutral pH. The organic layer was dried over anhydrous magnesium sulfate and filtered through Celite. The filtrate was concentrated, whereby the target diamine monomer (10) (1.13 g, 2.61 mmol, yield: 73%) was obtained.

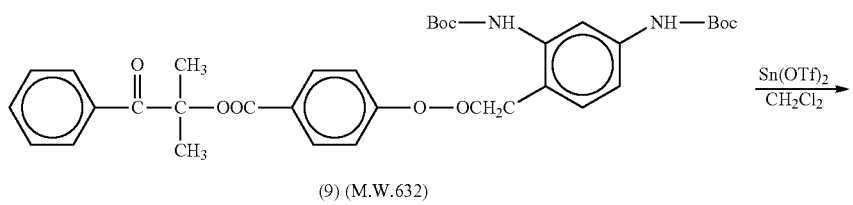

(9) (M.W.632)

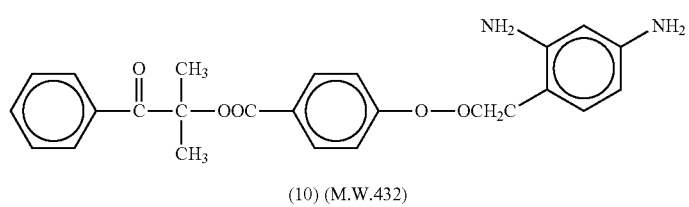

(10) (M.W.432)

With the compound (4) and the compound (8) in place of the compound (7), a diamine monomer represented by the following formula (11) can be synthesized in the same manner.

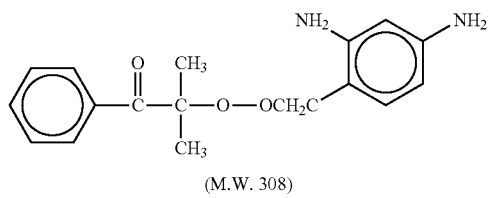

(M.W. 308)

Condensation Polymerization Example 1

The following shows an exemplary synthesis with 10 mol % of a polymerization initiator group-containing diamine unit introduced.

The following acid anhydride (0.10 mol) was added to a γ-butyrolactone solution containing the following paraphenylenediamine (0.09 mol) and the following 2-hydroxy-2-methyl-1-phenyl-propan-1-on functional group-containing diamine (0.01 mol), and the mixture was reacted at 60° C. for 12 hours, whereby a polyamic acid having a random structure was obtained.

Synthesis Example 1-Compound (11)

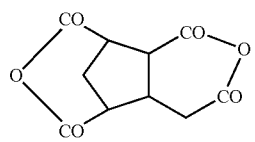

Acid anhydride

Diamine
(Paraphenylenediamine)

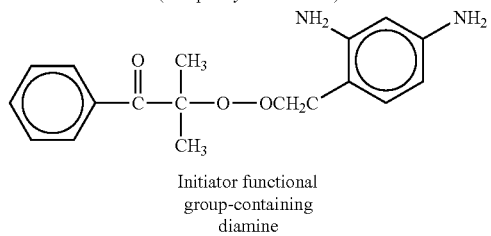

Initiator functional
group-containing
diamine

Synthesis Example 2

The following shows an exemplary synthesis of a diamine monomer containing a benzyl ketal-based initiator in a side chain.

Process A

A benzene solution (5 mL) containing 0.64 g (2.5 mmol) of benzyl dimethyl ketal represented by the following formula (2) was dropwise added into a benzene solution (20 mL) containing 0.42 g (2.5 mmol) of ethyl 4-hydroxybenzoate (the following formula (1)) and 0.5 g (5 mmol) of triethylamine at room temperature in a nitrogen atmosphere. The mixture was reacted at room temperature for two hours. After completion of the reaction, the impurities were extracted with water, and the residue was purified by column chromatography (toluene/ethyl acetate (4/1)), whereby 0.878 g (yield: 90%) of the target compound represented by the following formula (3) was obtained.

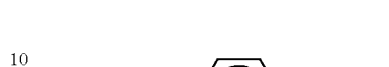

(1) (M.W. 165)

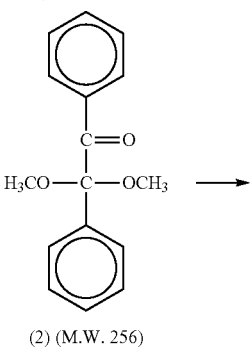

(2) (M.W. 256)

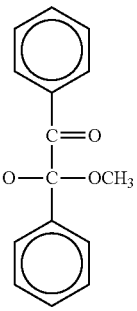

(3) (M.W. 390)

Process B

Into a THF/methanol mixed solution (20 mL) containing 0.78 g (2 mmol) of the compound represented by the formula (3) was dropwise added a sodium hydroxide aqueous solution and then hydrochloric acid. The mixture was stirred for one hour, so that a carboxylic acid compound represented by the following formula (4) was synthesized (0.69 g, 1.9 mmol).

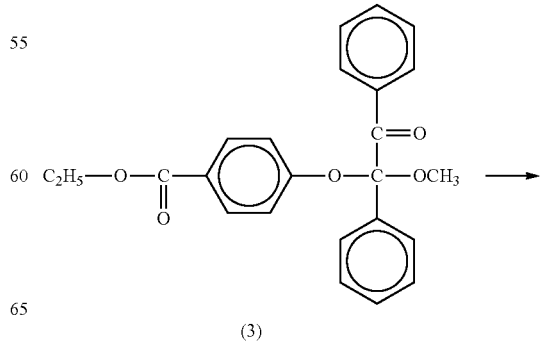

(3)

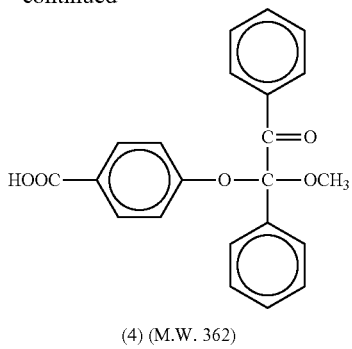

(4) (M.W. 362)

A compound represented by the following formula (5) was synthesized by repeating the processes A and B.

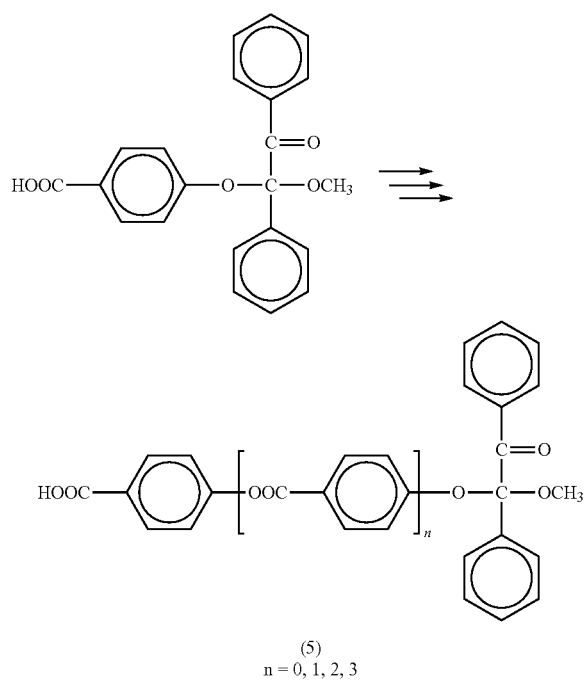

(5)
n = 0, 1, 2, 3

Process C

An amount of 3 g of dinitrophenyl acetate was dissolved in 20 mL of THF, followed by dropwise addition of borane dimethyl sulfide-toluene solution (7 mL) into the solution. The resulting mixture was left to stand overnight at room temperature. The reaction was terminated by dropwise adding 10 mL of a 50% methanol aqueous solution to the mixture. The target component was extracted with 10 mL of chloroform, washed with 5% sodium bicarbonate waiter and water, and concentrated until dissolution into the organic layer stopped. The resulting liquid was dissolved in 20 mL of chloroform, and the solution was purified by aluminum column chromatography. The distillate was concentrated. A toluene/n-heptane solution (6/4) was added to the concentrate, and a component was heat-extracted at 70° C. and isolated. Decantation was used to obtain the upper layer of the component. The component was cooled to obtain 2,4-dinitrophenyl ethanol (7) (1.2 g, yield: 42.7%). An amount of 0.4 g of the compound (7) was dissolved in 8 mL of SOLMIX AP-I, followed by addition of 0.06 g of Raney Ni to the solution. The mixture was fed into an autoclave. The system was purged with hydrogen and left to stand overnight at room temperature under a pressure of 0.4 MPa. HPLC was used to confirm that the reaction was completed, and then the reaction liquid was filtered through Celite. The filtrate was concentrated no filtrate was observed. The thus-obtained crude liquid was distilled under reduced pressure, so that 0.69 g (yield: 80%) of 2,4-diaminophenyl ethanol (8) was obtained. An amount of 0.6 g of the compound (8) was dissolved in 5 mL of acetone, followed by dropwise addition of a t-butoxycarbonyl anhydride (1.8 g/THF 5 mL). The resulting mixture was heated to the reflux temperature and left to stand overnight. After the completion of the reaction, the reaction liquid was concentrated and dried, whereby a Boc compound (9) (0.13 g, yield: 94%) was obtained.

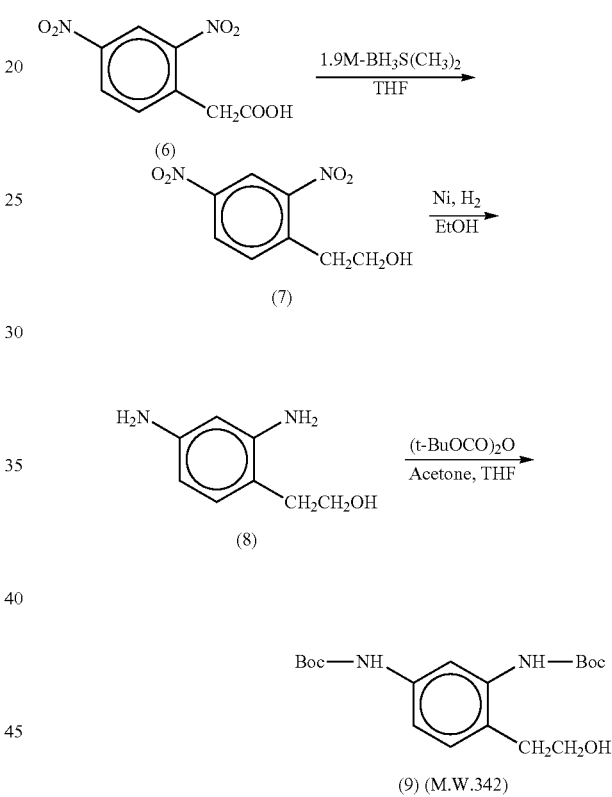

(9) (M.W.342)

Process D

The Boc compound (9) and a carboxylic acid compound represented by the following formula (5) were reacted by the same process as Process A, so that a compound represented by the following formula (10) was synthesized. The Boc compound was then converted back to a diamine, so that the target monomer (11) was synthesized. The following shows how to synthesize the monomer (11) from the compound (10). The compound (10) was dissolved in methylene chloride, followed by adding tin(II) trifluoromethanesulfonate (Sn(OTf)$_2$) in portions to the solution at 0° C., The mixture was reacted at room temperature, and then neutralized with 5% NaHCO$_3$aq. The mixture was washed with water until it had a neutral pH. The organic layer was dried over anhydrous magnesium sulfate and filtered through Celite. The filtrate was concentrated, whereby a diamine monomer (11) was obtained.

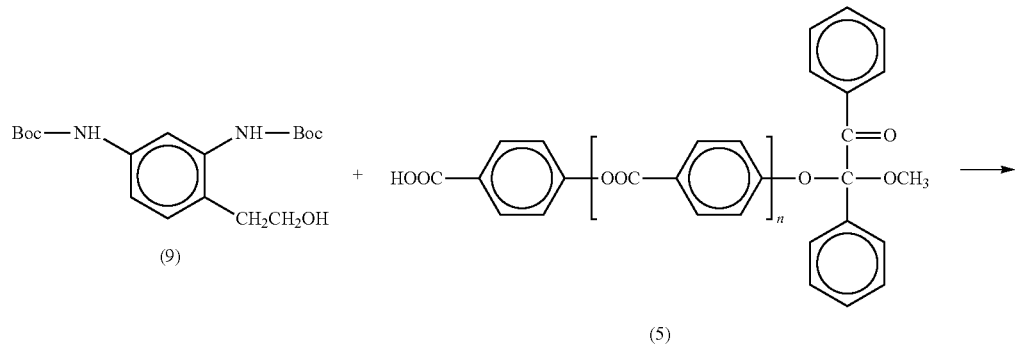

(9) + (5) →

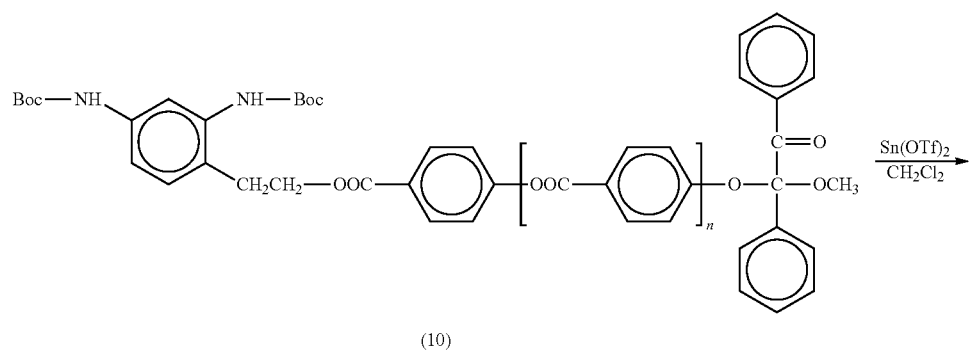

(10) $\xrightarrow{\text{Sn(OTf)}_2}{\text{CH}_2\text{Cl}_2}$

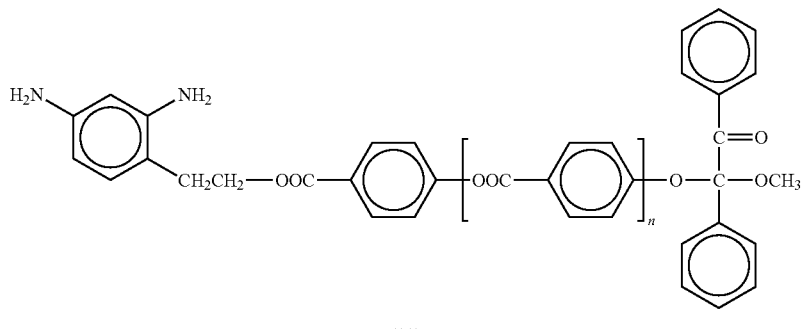

(11)

n = 0,1,2,3

Condensation Polymerization Example 2

The following shows an exemplary synthesis with 10 mol % of a benzyl ketal-based polymerization initiator group-containing diamine unit introduced.

The following acid anhydride (0.10 mol) was added to a γ-butyrolactone solution containing the following paraphenylenediamine (0.09 mol) and the following benzyl ketal-based polymerization initiator group-containing diamine (0.01 mol), and the mixture was reacted at 60° C. for 12 hours, whereby a polyamic acid having a random structure was obtained.

Synthesis Example 2-Compound (11)

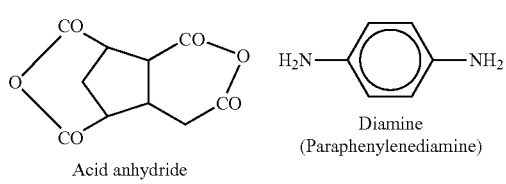

Acid anhydride     Diamine (Paraphenylenediamine)

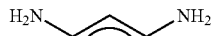
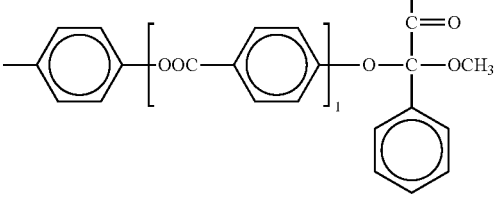

Initiator functional
group-containing
diamine

Condensation Polymerization Example 3

The following shows an exemplary synthesis with 10 mol % of a polymerization initiator group-containing diamine unit introduced.

The following acid anhydride (0.10 mol) was added to a γ-butyrolactone solution containing the following photo-functional group-containing diamine (0.09 mol) and the following 2-hydroxy-2-methyl-1-phenyl-propan-1-on functional group-containing diamine (0.01 mol), and the mixture was reacted at 60° C. for 12 hours, whereby a polyamic acid having a random structure was obtained.

Condensation Polymerization Example 4

The following shows an exemplary synthesis with 10 mol % of a polymerization initiator group-containing diamine unit introduced.

The following acid anhydride (0.10 mol) was added to a γ-butyrolactone solution containing the following vertical alignment functional group-containing diamine (0.03 mol), the following p-phenylene diamine (0.06 mol), and the following polymerization initiator group-containing diamine (0.01 mol), and the mixture was reacted at 60° C. for 12 hours, whereby a polyamic acid having a random structure was obtained.

Synthesis Example 1-Compound (10)

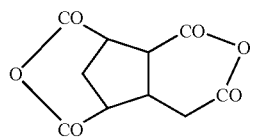

Acid anhydride

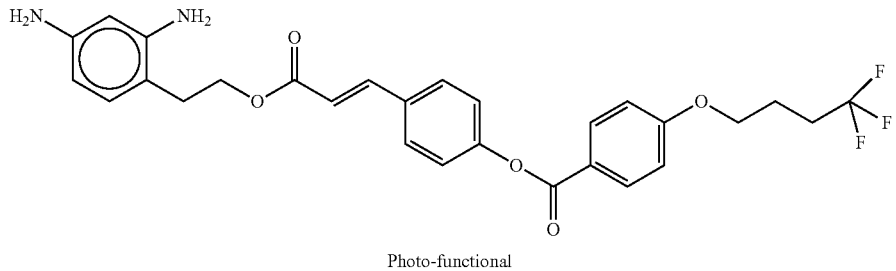

Photo-functional
group-containing
diamine

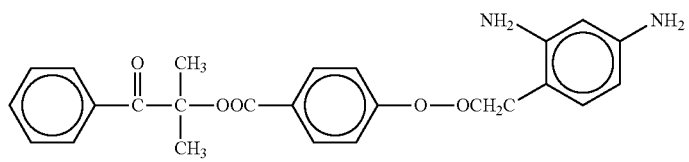

Initiator functional
group-containing
diamine

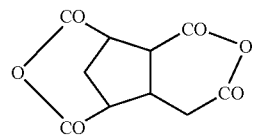

Acid anhydride

Synthesis Example 2-Compound (11)

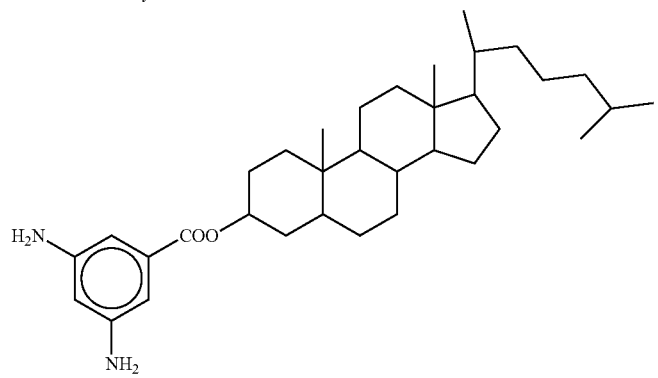

Vertical alignment functional
group-containing diamine

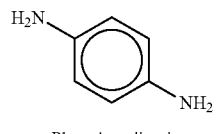

p-Phenylenediamine

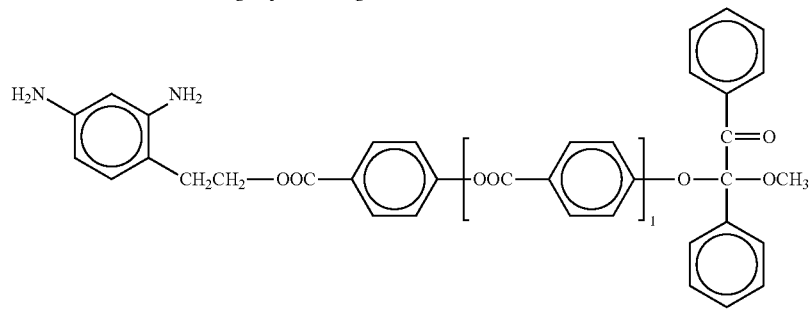

Initiator functional
group-containing
diamine

Example 1-1

(Production of Liquid Crystal Cell)

A TFT substrate and a counter substrate with no electrode for the FFS mode were prepared. A horizontal alignment film was formed on each of the TFT substrate and the counter substrate using a polyamic acid containing in a side chain an initiator functional group synthesized as in Condensation Polymerization Example 1. The amount m of the initiator functional group-containing diamine unit introduced into the polyamic acid was 20 mol %. A seal was applied to one of the substrates, and beads were scattered on the counter substrate. The substrates were then bonded to each other. Between the substrates was injected a liquid crystal material having positive anisotropy of dielectric constant (Tni=85° C., Δn=0.11, Δε=6.5). The liquid crystal material contained 0.6 wt. % of a chalcone group-containing bifunctional monomer represented by the following formula (3-4). The liquid crystal material injection was followed by heating at 130° C. and quenching. The liquid crystal cell was irradiated with linearly polarized ultraviolet rays having a wavelength of 365 nm for 30 minutes (irradiation dose: 3 J/cm$^2$) with a cell temperature of 90° C. to polymerize the monomer, and thereby an FFS mode liquid crystal cell was obtained.

(3-4)

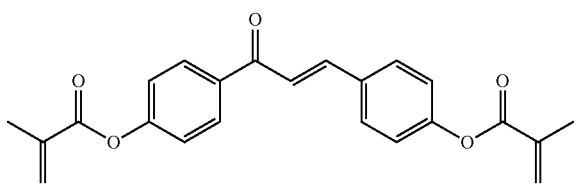

Examples 1-2 to 1-5

FFS mode liquid crystal cells of Examples 1-2, 1-3, 1-4, and 1-5 were produced as in Example 1-1, except that the amount m of the initiator functional group-containing diamine unit introduced into the polyamic acid was changed to 40 mol %, 60 mol %, 80 mol %, and 100 mol %, respectively.

Comparative Example 1-1

An FFS mode liquid crystal cell of Comparative Example 1-1 was produced as in Example 1-1, except that the amount m of the initiator functional group-containing diamine unit introduced into the polyamic acid was changed to 0 mol %.

Comparative Example 1-2

An FFS mode liquid crystal cell of Comparative Example 1-2 was produced as in Comparative Example 1-1, except that the cell temperature in the polarized ultraviolet light application for polymerization of the monomer was changed to room temperature (35° C.).

Comparative Examples 1-3 to 1-7

FFS mode liquid crystal cells of Comparative Examples 1-3, 1-4, 1-5, 1-6, and 1-7 were produced as in Examples 1-1, 1-2, 1-3, 1-4, and 1-5, respectively, except that the cell temperature in the polarized ultraviolet light application for polymerization of the monomer was changed to room temperature (35° C.).

Comparative Example 1-8

An FFS mode liquid crystal cell of Comparative Example 1-8 was produced as in Comparative Example 1-1, except that the liquid crystal material contained 0.6 wt. % of a bifunctional monomer represented by the following formula (M-1) instead of the monomer represented by the formula (3-4).

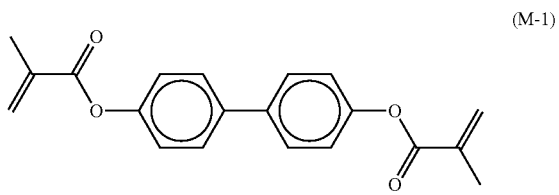

(M-1)

Comparative Examples 1-9 to 1-13

FFS mode liquid crystal cells of Comparative Examples 1-9, 1-10, 1-11, 1-12, and 1-13 were produced as in Examples 1-1, 1-2, 1-3, 1-4, and 1-5, respectively, except that the liquid crystal material contained 0.6 wt % of a bifunctional monomer represented by the formula (M-1) instead of the monomer represented by the formula (3-4).

(Alignment Confirmation)

The alignment in each of the obtained liquid crystal cells was visually confirmed.

(Backlight Exposure Power-On Test)

Each of the produced liquid crystal cells was sandwiched between polarizers and then power was supplied to the workpiece on a backlight for 100 hours. The power supply conditions were 10 V and 30 Hz. The contrast ratio, the voltage holding ratio (VHR), and residual DC (rDC) voltage before and after the power supply to the workpiece on the backlight were measured. The contrast ratio was measured using BM-5A from Topcon Corporation (25° C.). The VHR was measured at 1 V (70° C.) using a VHR measurement system from Toyo Corp. The rDC voltage was measured at a DC offset voltage of 2 V by flicker elimination method.

The results are shown in the following Tables 1-1 to 1-3.

TABLE 1-1

Results of using chalcone group-containing bifunctional monomer and applying polarized UV light at 90° C.

| | | Comparative Example 1-1 | Example 1-1 | Example 1-2 | Example 1-3 | Example 1-4 | Example 1-5 |
|---|---|---|---|---|---|---|---|
| Initiator introduced (mol %) | | m = 0 | m = 20 | m = 40 | m = 60 | m = 80 | m = 100 |
| Alignment state | Initial | Horizontally aligned | Horizontally aligned | Horizontally aligned | Horizontally aligned | Horizontally aligned | Horizontally aligned |
| Contrast ratio | Initial | 800 | 800 | 800 | 800 | 800 | 800 |
| | 100 h | 710 | 800 | 800 | 800 | 800 | 800 |
| VHR (%) | Initial | 99.4 | 99.5 | 99.5 | 99.3 | 99.2 | 99.0 |
| | 100 h | 96.2 | 98.8 | 99.0 | 99.1 | 99.0 | 98.7 |
| iDC voltage (mV) | Initial | 10 | 10 | 20 | 30 | 40 | 40 |
| | 100 h | 130 | 30 | 30 | 30 | 40 | 40 |

TABLE 1-2

Results of using chalcone group-containing bifunctional monomer and applying polarized UV light at 35° C.

| | | Comparative Example 1-2 | Comparative Example 1-3 | Comparative Example 1-4 | Comparative Example 1-5 | Comparative Example 1-5 | Comparative Example 1-7 |
|---|---|---|---|---|---|---|---|
| Initiator introduced (mol %) | | m = 0 | m = 20 | m = 40 | m = 60 | m = 80 | m = 100 |
| Alignment state | Initial | Random | Random | Random | Random | Random | Random |
| Contrast ratio | Initial | | | (Unmeasurable due to unaligned state) | | | |
| VHR (%) | Initial | 99.5 | 99.5 | 99.6 | 99.5 | 99.5 | 99.4 |
| | 100 h | 98.1 | 99.5 | 99.4 | 99.2 | 99.4 | 99.1 |
| rDCvoltage (mV) | Initial | | | (Unmeasurable due to unaligned state) | | | |

TABLE 1-3

Results of using biphenyl group-containing bifunctional monomer and applying polarized UV light at 90° C.

| | | Comparative Example 1-8 | Comparative Example 1-9 | Comparative Example 1-10 | Comparative Example 1-11 | Comparative Example 1-12 | Comparative Example 1-13 |
|---|---|---|---|---|---|---|---|
| Initiator introduced (mol %) | | m = 0 | m = 20 | m = 40 | m = 60 | m = 80 | m = 100 |
| Alignment state | Initial | Random | Random | Random | Random | Random | Random |
| Contrast ratio | Initial | (Unmeasurable due to unaligned state) | | | | | |
| VHR (%) | Initial | 99.5 | 99.6 | 99.5 | 995 | 99.6 | 99.6 |
| | 100 h | 98.8 | 99.5 | 99.5 | 99.5 | 99.3 | 99.4 |
| rDCvoltage (mV) | Initial | (Unmeasurable due to unaligned state) | | | | | |

Only when the chalcone group-containing bifunctional monomer represented by the formula (3-4) was used and polarized ultraviolet light was applied at 90° C. (equal to or higher than the Tni of the liquid crystal material), the horizontal alignment was achieved. Also, Table 1-1 shows that in the cases where the polymerization initiator functional group was introduced into a side chain of a polyamic acid (partially imidized) constituting the alignment films (m=20 to 100), the backlight exposure turn-on test did not cause a contrast ratio decrease, a VHR decrease, or a rDC voltage increase.

Table 1-2 shows that the horizontal alignment was not achieved by applying polarized ultraviolet light at 35° C. (lower than the Tni of the liquid crystal material) even when the chalcone group-containing bifunctional monomer represented by the formula (3-4) was used. For achievement of the horizontal alignment mode, reducing scattering of polarized ultraviolet light, which is the light applied, by transforming the liquid crystal material into an isotropic phase seems to be important.

Also, Table 1-3 shows that the horizontal alignment was not achieved by applying polarized ultraviolet light at 90° C. when the biphenyl group-containing bifunctional monomer, which is a conventionally used monomer for PSA, was used (formula (M-1)). This is presumably because a biphenyl group was not alignable in the polymer layer formation using polarized ultraviolet light, and thus the liquid crystal alignability was not achieved.

Example 2-1

(Production of Liquid Crystal Cell)

A TFT substrate and a counter substrate with no electrode for the FFS mode were prepared. A horizontal alignment film was formed on each of the TFT substrate and the counter substrate using a polyamic acid containing in a side chain an initiator functional group synthesized as in Condensation Polymerization Example 2. The amount m of the initiator functional group-containing diamine unit introduced into the polyamic acid was 20 mol %. A seal was applied to one of the substrates, and beads were scattered on the counter substrate. The substrates were then bonded to each other. Between the substrates was injected a liquid crystal material having positive anisotropy of dielectric constant (Tni=70° C., Δn=0.12, Δε=2.6). The liquid crystal material contained 0.8 wt % of a chalcone group-containing bifunctional monomer represented by the formula (3-4). The liquid crystal material injection was followed by heating at 130° C. and quenching. The liquid crystal cell was irradiated with linearly polarized ultraviolet rays having a wavelength of 365 nm for 30 minutes (irradiation dose: 3 J/cm$^2$) with a cell temperature of 80° C. to polymerize the monomer, and thereby an FFS mode liquid crystal cell was obtained.

Examples 2-2 to 2-5

FFS mode liquid crystal cells of Examples 2-2, 2-3, 2-4, and 2-5 were produced as in Example 2-1, except that the amount m of the initiator functional group-containing diamine unit introduced into the polyamic acid was changed to 40 mol %, 60 mol %, 80 mol %, and 100 mol %, respectively.

Comparative Example 2-1

An FFS mode liquid crystal cell of Comparative Example 2-1 was produced as in Example 2-1, except that the amount m of the initiator functional group-containing diamine unit introduced into the polyamic acid was changed to 0 mol %.

Comparative Example 2-2

An FFS mode liquid crystal cell of Comparative Example 2-2 was produced as in Comparative Example 2-1, except that the cell temperature in the polarized ultraviolet light application for polymerization of the monomer was changed to room temperature (35° C.).

Comparative Examples 2-3 to 2-1

FFS mode liquid crystal cells of Comparative Examples 2-3, 2-4, 2-5, 2-6, and 2-7 were produced as in Examples 2-1, 2-2, 2-3, 2-4, and 2-5, respectively, except that the cell temperature in the polarized ultraviolet light application for polymerization of the monomer was changed to room temperature (35° C.).

Comparative Example 2-8

An FFS mode liquid crystal cell of Comparative Example 2-8 was produced as in Comparative Example 2-1, except that the liquid crystal material contained 0.8 wt % of a bifunctional monomer represented by the formula (M-1) instead of the monomer represented by the formula (3-4).

Comparative Examples 2-9 to 2-13

FFS mode liquid crystal cells of Comparative Examples 2-9, 2-10, 2-11, 2-12, and 2-13 were produced as in Examples 2-1, 2-2, 2-3, 2-4, and 2-5, respectively, except that the liquid crystal material contained 0.8 wt % of a bifunctional monomer represented by the formula (M-1) instead of the monomer represented by the formula (3-4).

The liquid crystal cells were subjected to the same evaluations as in Example 1-1 and the other examples. The results are shown in the following Tables 2-1 to 2-3.

TABLE 2-1

Results of using chalcone group-containing bifunctional monomer and applying polarized UV light at 80° C.

|  |  | Comparative Example 2-1 | Example 2-1 | Example 2-2 | Example 2-3 | Example 2-4 | Example 2-5 |
|---|---|---|---|---|---|---|---|
| Initiator introduced (mol %) |  | m = 0 | m = 20 | m = 40 | m = 60 | m = 80 | m = 100 |
| Alignment state | Initial | Horizontally aligned | Horizontally aligned | Horizontally aligned | Horizontally aligned | Horizontally aligned | Horizontally aligned |
| Contrast ratio | Initial | 820 | 840 | 840 | 830 | 810 | 800 |
|  | 100 h | 740 | 810 | 810 | 820 | 810 | 800 |
| VHR (%) | Initial | 99.3 | 99.1 | 99.1 | 99.1 | 99.0 | 98.9 |
|  | 100 h | 95.9 | 98.8 | 99.0 | 99.1 | 99.0 | 98.8 |
| rDCvoltage (mV) | Initial | 0 | 0 | −10 | −10 | −20 | −20 |
|  | 100 h | 150 | 40 | 20 | 10 | 10 | 0 |

TABLE 2-2

Results of using chalcone group-containing bifunctional monomer and applying polarized UV light at 35° C.

|  |  | Comparative Example 2-2 | Comparative Example 2-3 | Comparative Example 2-4 | Comparative Example 2-5 | Comparative Example 2-6 | Comparative Example 2-7 |
|---|---|---|---|---|---|---|---|
| Initiator intoduced (mol %) |  | m = 0 | m = 20 | m = 40 | m = 60 | m = 80 | m = 100 |
| Alignment state | Initial | Rixtom | Random | Random | Random | Random | Random |
| Contrast ratio | Initial | (Unmeasurable due to unaligned state) | | | | | |
| VHR (%) | Initial | 99.4 | 99.2 | 99.2 | 99.2 | 99.1 | 99.1 |
|  | 100 h | 98.0 | 99.0 | 99.0 | 98.9 | 99.0 | 98.9 |
| rDC voltage (mV) | Initial | (Unmeasurable due to unaligned state) | | | | | |

TABLE 2-3

Results of using biphenyl group-containing bifunctional monomer and applying polarized UV light at 80° C.

|  |  | Comparative Example 2-8 | Comparative Example 2-9 | Comparative Example 2-10 | Comparative Example 2-11 | Comparative Example 2-12 | Comparative Example 2-13 |
|---|---|---|---|---|---|---|---|
| Initiator intoduced (mol %) |  | m = 0 | m = 20 | m = 40 | m = 60 | m = 80 | m = 100 |
| Alignment state | Initial | Random | Random | Raidom | Random | Random | Random |
| Contrast ratio | Initial | (Unmeasurable due to unaligned state) | | | | | |
| VHR (%) | Initial | 99.1 | 99.1 | 98.8 | 99.0 | 99.1 | 99.0 |
|  | 100 h | 96.2 | 98.7 | 98.6 | 98.7 | 98.7 | 98.6 |
| rDC voltage (mV) | Initial | (Unmeasurable due to unaligned state) | | | | | |

Only when the chalcone group-containing bifunctional monomer represented by the formula (3-4) was used and polarized ultraviolet light was applied at 80° C. (equal to or higher than the Tni of the liquid crystal material), the horizontal alignment was achieved. Also, Table 2-1 shows that in the cases where a polymerization initiator functional group was introduced into a side chain of a polyamic acid (partially imidized) constituting the alignment film (m=20 to 100), the backlight exposure turn-on test did not cause a contrast ratio decrease, a VHR decrease, or a rDC voltage increase.

Table 2-2 shows that the horizontal alignment was not achieved by applying polarized ultraviolet light at 35° C. (lower than the Tni of the liquid crystal material) even when the chalcone group-containing bifunctional monomer represented by the formula (3-4) was used. For achievement of the horizontal alignment mode, reducing scattering of polarized ultraviolet light, which is the light applied, by transforming the liquid crystal material into an isotropic phase seems to be important.

Also, Table 2-3 shows that the horizontal alignment was not achieved by applying polarized ultraviolet light at 80° C. when the biphenyl group-containing bifunctional monomer, which is a conventionally used monomer for PSA, was used (formula (M-1)). This is presumably because a biphenyl group was not alignable in the polymer layer formation using polarized ultraviolet light, and thus the liquid crystal alignability was not achieved.

Example 3-1

(Production of Liquid Crystal Cell)

A pair of substrates each having an ITO electrode on its entire surface was prepared. A vertical photo-alignment film was formed on each of the substrates using a polyamic acid containing in a side chain an initiator functional group synthesized as in Condensation Polymerization Example 3 and a vertical photo-functional group. The amount m of the initiator functional group-containing diamine unit introduced into the polyamic acid was 10 mol %. The film formation includes pre-baking the applied alignment agent at 80° C. for five minutes and then post-baking it at 200° C. for 40 minutes. The alignment agent was then irradiated with polarized ultraviolet light with an intensity of 30 mJ/cm$^2$ for an alignment, treatment which enables the alignment films to give a pre-tilt angle of 88.5° (substantially vertical alignment). A seal was applied to one of the substrates, and beads were scattered on the other substrate. The substrates were then bonded to each other. Between the substrates was injected a liquid crystal material having negative anisotropy of dielectric constant (Tni=75° C., Δn=0.10, Δε=−3.2). The liquid crystal material contained 0.6 wt % of a chalcone group-containing bifunctional monomer represented by the following formula (3-3). The liquid crystal material injection was followed by heating at 130° C. and quenching. The liquid crystal cell was irradiated with unpolarized ultraviolet light having a wavelength of 365 nm for 30 minutes (irradiation dose: 3 J/cm$^2$) with a cell temperature of 35° C. to polymerize the monomer, and thereby a 4D-RTN mode liquid crystal cell was obtained.

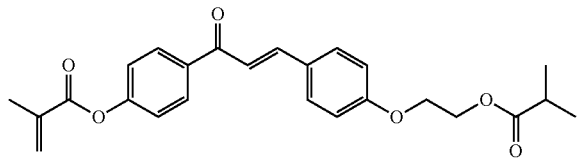

(3-3)

Examples 3-2 to 3-5

4D-RTN mode liquid crystal cells of Examples 3-2, 3-3, 3-4, and 3-5 were produced as in Example 3-1, except that the amount m of the initiator functional group-containing diamine unit introduced into the polyamic acid was changed to 20 mol %, 30 mol %, 40 mol %, and 50 mol %, respectively.

Comparative Example 3-1

A 4D-RTN mode liquid crystal cell of Comparative Example 3-1 was produced as in Example 3-1, except that the amount m of the initiator functional group-containing diamine unit introduced into the polyamic acid was changed to 0 mol %.

Comparative Example 3-2

A 4D-RTN mode liquid crystal cell of Comparative Example 3-2 was produced as in Comparative Example 3-1, except that the liquid crystal material contained 0.6 wt. % of a bifunctional monomer represented by the formula (M-2) instead of the monomer represented by the formula (3-3).

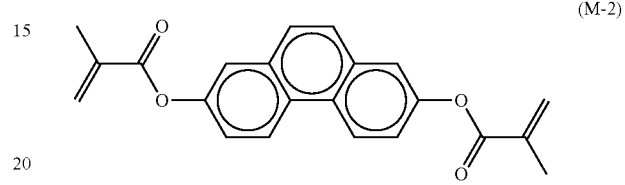

(M-2)

Comparative Examples 3-3 to 3-7

4D-RTN mode liquid crystal cells of Comparative Examples 3-3, 3-4, 3-5, 3-6, and 3-7 were produced as in Examples 3-1, 3-2, 3-3, 3-4, and 3-5, respectively, except that the liquid crystal material contained 0.6 wt % of a bifunctional monomer represented by the formula (M-2) instead of the monomer represented by the formula (3-3).

The liquid crystal cells were subjected to the same evaluations as in Example 1-1 and the other examples. The results are shown in the following Tables 3-1 and 3-2.

TABLE 3-1

Result of using chalcone group-containing bifunctional monomer and applying polarized UV light at 35° C.

| | | Comparative Example 3-1 | Example 3-1 | Example 3-2 | Example 3-3 | Example 3-4 | Example 3-5 |
|---|---|---|---|---|---|---|---|
| Initiator introduced (mol %) | | m = 0 | m = 10 | m = 20 | m = 30 | m = 40 | m = 50 |
| Alignment state | Initial | Substantially vertically aligned | Substantially vertically aligned | Substantially vertically aligned | Substantially vertically aligned | Substantially vertically aligned | Substantially vertically aligned |
| Contrast ratio | Initial | 5000 | 5000 | 5000 | 5000 | 4800 | 4400 |
| | 100 h | 4900 | 5000 | 5000 | 5000 | 4800 | 4000 |
| VHR (%) | Initial | 99.4 | 99.4 | 99.4 | 99.4 | 99.4 | 99.5 |
| | 100 h | 96.0 | 98.9 | 99.2 | 99.3 | 99.3 | 99.4 |
| rDC voltage (mV) | Initial | −10 | −10 | −10 | −10 | −20 | −20 |
| | 100 h | 90 | 20 | 20 | 10 | 0 | 0 |

TABLE 3-2

Result of using phenanthrene group-containing bifunctional monomer and applying polarized UV light at 35° C.

| | | Comparative Example 3-2 | Comparative Example 3-3 | Comparative Example 3-4 | Comparative Example 3-5 | Comparative Example 3-6 | Comparative Example 3-7 |
|---|---|---|---|---|---|---|---|
| Initiator introduced (mol %) | | m = 0 | m = 10 | m = 20 | m = 30 | m = 40 | m = 50 |
| Alignment state | Initial | Substantially vertically aligned | Substantially vertically aligned | Substantially vertically aligned | Substantially vertically aligned | Substantially vertically aligned | Substantially vertically aligned |
| Contrast ratio | Initial | 5000 | 5000 | 5000 | 5000 | 4800 | 4400 |
| | 100 h | 4700 | 5000 | 5000 | 5000 | 4800 | 3900 |
| VHR (%) | Initial | 99.4 | 99.5 | 99.5 | 99.4 | 99.4 | 99.5 |
| | 100 h | 96.3 | 97.7 | 97.8 | 98.4 | 96.9 | 99.1 |

TABLE 3-2-continued

Result of using phenanthrene group-containing bifunctional monomer and applying polarized UV light at 35° C.

|  |  | Comparative Example 3-2 | Comparative Example 3-3 | Comparative Example 3-4 | Comparative Example 3-5 | Comparative Example 3-6 | Comparative Example 3-7 |
|---|---|---|---|---|---|---|---|
| rDC voltage (mV) | Initial | −10 | −20 | −20 | −20 | −20 | −30 |
|  | 100 h | 70 | 50 | 50 | 40 | 10 | 20 |

When a chalcone-containing monomer represented by the formula (3-3) was used, unpolarized ultraviolet light was applied at 35° C. (common PSA conditions) (Table 3-1), and a polymerization initiator functional group was introduced into a side chain of a polyamic acid (partially imidized) constituting the vertical photo-alignment film (m=10 to 50), the backlight exposure power-on test did not cause a VHR decrease or a rDC voltage increase. However, with m=50, the contrast ratio decreased. This is presumably because the introduction of 50 mol % of the polymerization initiator group reduced the amount of the vertical photo-functional group introduced to 50 mol %, decreasing the alignment stability (i.e., stability of the pre-tilt angle).

Table 3-2 shows that when a phenanthrene group-containing bifunctional monomer, which is a conventionally used monomer for PSA, was used (formula (M-2)), the VHR after 100-hour aging decreased as compared with the case of using a monomer represented by the formula (3-3). This is presumably because the phenanthrene group in the formula (M-2) can absorb ultraviolet light having a longer wavelength than a chalcone group, and was therefore slightly deteriorated under backlight illumination.

Example 4-1

(Production of Liquid Crystal Cell)

A pair of substrates each having an ITO electrode provided with slits was prepared. A vertical photo-alignment film was formed on each of the substrates using a polyamic acid containing in a side chain an initiator-functional group synthesized as in Condensation Polymerization Example 4 and a vertical functional group. The amount m of the initiator functional group-containing diamine unit introduced into the polyamic acid was 10 mol %. The film formation includes pre-baking the applied alignment agent at 80° C. for five minutes and then post-baking it at 200° C. for 40 minutes. In the present example, the alignment films were not subjected to any special alignment treatment. Still, the vertical alignment can be achieved. A seal was applied to one of the substrates, and beads were scattered on the other substrate. The substrates were then bonded to each other. Between the substrates was injected a liquid crystal material having negative anisotropy of dielectric constant (Tni=75° C., Δn=0.09, Δε=−3.0). The liquid crystal material contained 0.3 wt % of a chalcone group-containing bifunctional monomer represented by the following formula (3-1). The liquid crystal material injection was followed by heating at 130° C. and quenching. The liquid crystal cell was irradiated with unpolarized ultraviolet light having a wavelength of 365 nm for 30 minutes (irradiation dose: 3 J/cm$^2$) with a cell temperature of 35° C. to polymerize the monomer while a voltage of 5 V was applied to the liquid crystal cell, and thereby a vertical alignment mode liquid crystal cell was obtained.

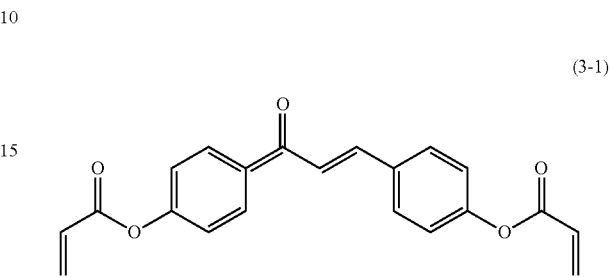

(3-1)

Examples 4-2 to 4-5

Vertical alignment mode liquid crystal cells of Examples 4-2, 4-3, 4-4, and 4-5 were produced as in Example 4-1, except that the amount m of the initiator functional group-containing diamine unit introduced into the polyamic acid was changed to 20 mol %, 30 mol %, 40 mol %, and 50 mol %, respectively.

Comparative Example 4-1

A vertical alignment mode liquid crystal cell of Comparative Example 4-1 was produced as in Example 4-1, except that the amount m of the initiator functional group-containing diamine unit introduced into the polyamic acid was changed to 0 mol %.

Comparative Example 4-2

A vertical alignment mode liquid crystal cell of Comparative Example 4-2 was produced as in Comparative Example 4-1, except that the liquid crystal material contained 0.3 wt % of a bifunctional monomer represented by the formula (M-2) instead of the monomer represented by the formula (3-1).

Comparative Examples 4-3 to 4-7

Vertical alignment mode liquid crystal cells of Comparative Examples 4-3, 4-4, 4-5, 4-6, and 4-7 were produced as in Examples 4-1, 4-2, 4-3, 4-4, and 4-5, respectively, except that the liquid crystal material contained 0.3 wt % of a bifunctional monomer represented by the formula (M-2) instead of the monomer represented by the formula (3-1).

The liquid crystal cells were subjected to the same evaluations as in Example 1-1 and the other examples. The results are shown in the following Tables 4-1 to 4-3.

TABLE 4-1

Result of using chalcone group-containing bifunctional monomer and applying polarized UV light at 35° C.

|  |  | Comparative Example 4-1 | Example 4-1 | Example 4-2 | Example 4-3 | Example 4-4 | Example 4-5 |
|---|---|---|---|---|---|---|---|
| Initiator introduced (mol %) |  | m = 0 | m = 10 | m = 20 | m = 30 | m = 40 | m = 50 |
| Alignment state | Initial | Substantially vertically aligned | Substantially vertically aligned | Substantially vertically aligned | Substantially vertically aligned | Substantially vertically aligned | Substantially vertically aligned |
| Contrast ratio | Initial | 5000 | 5000 | 5000 | 5000 | 5000 | 4900 |
|  | 100 h | 4900 | 5000 | 5000 | 5000 | 5000 | 4900 |
| VHR (%) | Initial | 99.5 | 99.5 | 99.5 | 99.5 | 99.5 | 99.6 |
|  | 100 h | 98.0 | 99.3 | 99.4 | 99.4 | 99.5 | 99.5 |
| rDC voltage (mV) | Initial | −10 | −10 | −20 | −30 | −30 | −20 |
|  | 100 h | 50 | 0 | 0 | −10 | −10 | −20 |

TABLE 4-2

Result of using phenanthrene group-containing bifunctional monomer and applying polarized UV light at 35° C.

|  |  | Comparative Example 4-2 | Comparative Example 4-3 | Comparative Example 4-4 | Comparative Example 4-5 | Comparative Example 4-6 | Comparative Example 4-7 |
|---|---|---|---|---|---|---|---|
| Initiator introduced (mol %) |  | m = 0 | m = 10 | m = 20 | m = 30 | m = 40 | m = 50 |
| Alignment state | Initial | Substantially vertically aligned | Substantially vertically aligned | Substantially vertically aligned | Substantially vertically aligned | Substantially vertically aligned | Substantially vertically aligned |
| Contrast ratio | Initial | 5000 | 5000 | 5000 | 5000 | 5000 | 5000 |
|  | 100 h | 4800 | 5000 | 5000 | 5000 | 4900 | 5000 |
| VHR (%) | Initial | 99.3 | 99.3 | 99.4 | 99.4 | 99.4 | 99.5 |
|  | 100 h | 98.3 | 98.8 | 98.9 | 99.1 | 99.1 | 99.2 |
| rDC voltage (mV) | Initial | −20 | −20 | −30 | −30 | −30 | −30 |
|  | 100 h | 50 | 0 | 0 | 0 | 0 | −10 |

When a chalcone-containing monomer represented by the formula (3-1) was used, unpolarized ultraviolet light was applied at 35° C. (with voltage applied) (Table 4-1), and a polymerization initiator functional group was introduced into a side chain of a polyamic acid (partially imidized) constituting the vertical photo-alignment film (m=10 to 50), the backlight exposure turn-on test did not cause a VHR decrease or a rDC voltage increase.

Table 4-2 shows that when a phenanthrene group-containing bifunctional monomer, which is a conventionally used monomer for PSA, was used (formula (M-2)), the VHR after 100-hour aging decreased as compared with the case of using a monomer represented by the formula (3-1). This is presumably because the phenanthrene group in the formula (M-2) can absorb ultraviolet light having a longer wavelength than a chalcone group, and was therefore slightly deteriorated under backlight illumination.

ADDITIONAL REMARKS

One aspect of the present invention may be a liquid crystal display device including: a pair of substrates; a liquid crystal layer held between the substrates; an alignment film disposed on a liquid crystal layer side surface of at least one of the substrates; and a polymer layer disposed between the liquid crystal layer and the alignment film, the liquid crystal layer containing liquid crystal compounds aligned in a predetermined direction with no voltage applied, the alignment film containing a first polymer containing in its main chain at least one selected from a polyamic acid structure and a polyimide structure, the first polymer containing at least one selected from a functional group represented by the following formula (A-1) and a functional group represented by the following formula (A-2), the polymer layer containing a second polymer obtained by polymerizing at least one monomer including at least one monomer (monomer (1)) represented by the following formula (1):

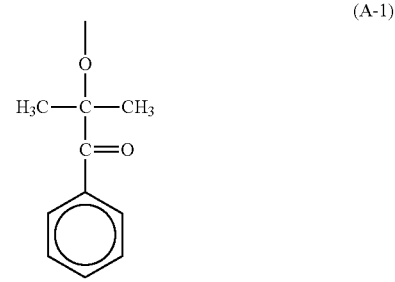

(A-1)

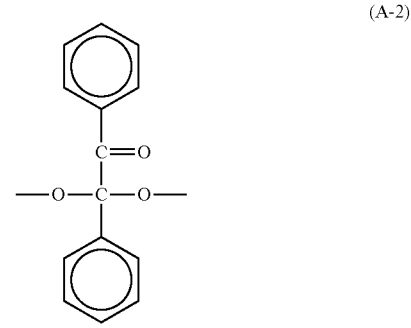

(A-2)

-continued (A-1)
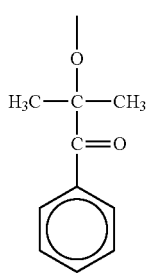

(A-2)
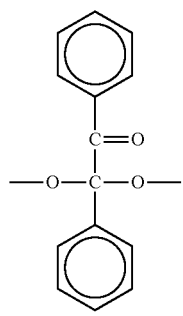

wherein P¹ and P² are the same as or different from each other, and each represent an acryloyloxy, methacryloyloxy, acryloylamino, methacryloylamino, vinyl, or vinyloxy group, Sp¹ and Sp² are the same as or different from each other, and each represent, a C1-C6 linear, branched, or cyclic alkylene or alkyleneoxy group, or a direct bond, and at least, one hydrogen atom in each phenylene group may be replaced.

In the above aspect of the liquid crystal display device, the first polymer in the alignment films contains at least one selected from the functional group represented by the formula (A-1) and the functional group represented by the formula (A-2). This configuration enables polymerization of the monomer added to the liquid crystal layer without adding a polymerization initiator or an initiator monomer to the liquid crystal layer. Also, radicals can be generated from these functional groups and reacted with the monomer added to the liquid crystal layer, so that the alignment film and the second polymer contained in the polymer layer can be covalently bonded to each other. This increases the formation rate of the polymer layer (polymerization rate of the monomer), reducing the ultraviolet ray irradiation dose for the liquid crystal layer in the polymer layer formation. Also, the polymer layer can be easily formed since it contains the second polymer obtained by polymerizing at least one monomer including at least one monomer represented by the formula (1), further reducing the ultraviolet ray irradiation dose for the liquid crystal layer 40 in the polymer layer formation. This is because a polymer of the monomer (1) is likely to separate from the liquid crystal layer 40. These conditions can prevent a VHR decrease and a residual DC voltage increase even when the liquid crystal display device of the present embodiment is used for a long period of time.

The at least one monomer represented by the formula (1) may include at least one monomer represented by any of the following formulas (2-1) and (2-2):

(2-1)
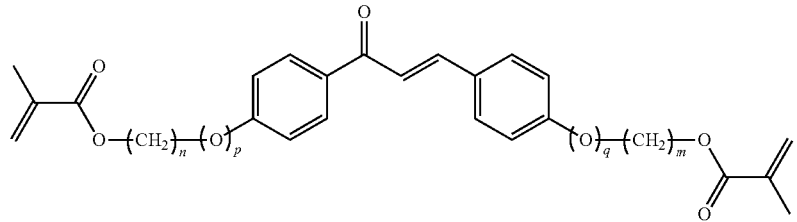

(2-2)
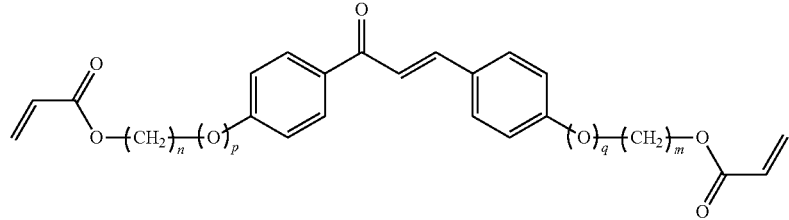

wherein p and q are the same as or different from each other, and each 0 or 1, and m and n are the same as or different from each other, and each an integer of 0 to 6.

The at least one monomer represented by the formula (1) may include at least one monomer represented by any of the following formulas (3-1) to (3-8):

(3-1)
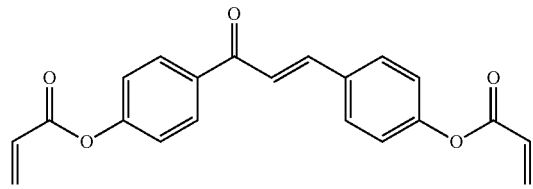

(3-2)
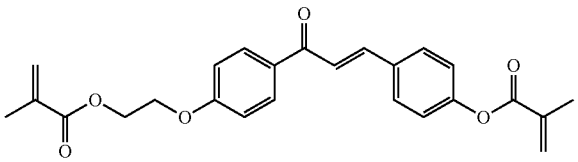

-continued (3-3)
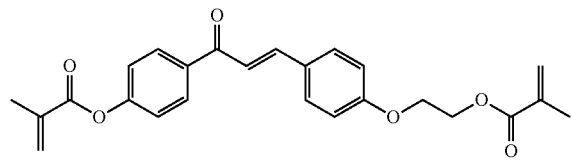

(3-4)
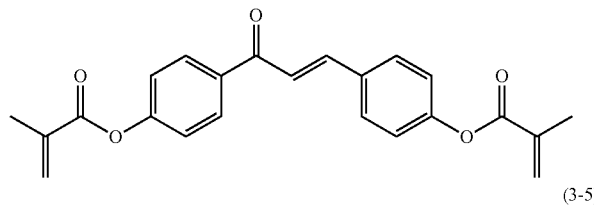

(3-5)
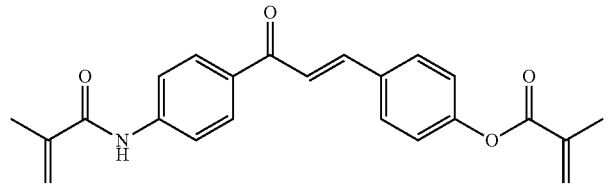

(3-6)
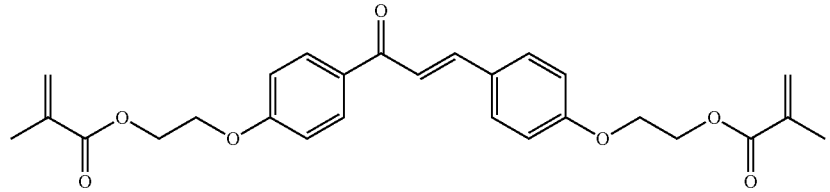

(3-7)
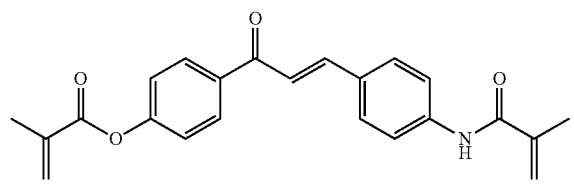

(3-8)
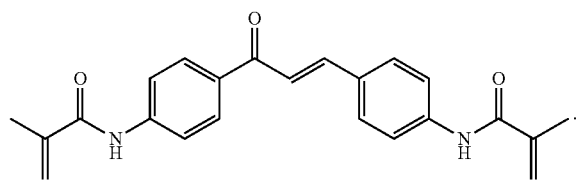

The first polymer may contain at least one photo-functional group.

The first polymer may contain at least one photo-functional group selected from the group consisting of a cinnamate group, an azobenzene group, a chalcone group, and a coumarin group, each of which may contain a substituent.

The liquid crystal display device may be in a liquid crystal driving mode of a horizontal alignment mode, and the polymer layer may align the liquid crystal compounds in a directional parallel to surfaces of the substrates.

The liquid crystal display device may be in a liquid crystal driving mode of an FFS mode, an IPS mode, an MVA mode, or a 4D-RTN mode.

Another aspect of the present invention may be a method for producing a liquid crystal display device including a liquid crystal layer containing liquid crystal compounds aligned in a predetermined direction with no voltage applied, the method including: preparing a pair of substrates; forming an alignment film by applying to a surface of at least one of the substrates an alignment agent that contains a first polymer containing at least one selected from a polyamic acid structure and a polyimide structure in its main chain and at least one selected from a functional group represented by the following formula (A-1) and a functional group represented by the following formula (A-2); forming a liquid crystal layer by sealing, between the substrates on at least one of which the alignment film is formed, a liquid crystal composition containing a liquid crystal material and at least one monomer including at least one monomer represented by the following formula (1); and forming a polymer layer from a second polymer between the alignment film and the liquid crystal layer by irradiating the liquid crystal layer with ultraviolet light, the second polymer being obtained by polymerizing the at least one monomer including at least one monomer represented by the following formula (1), (A-1)
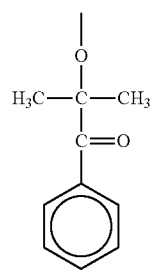

(A-2)
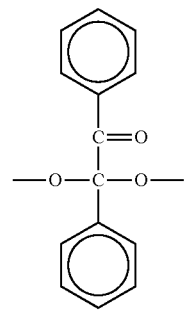

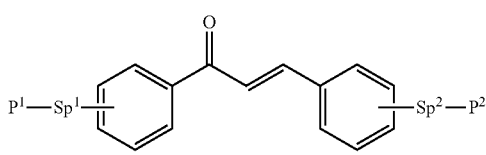

(1)

wherein $P^1$ and $P^2$ are the same as or different from each other, and each represent an acryloyloxy, methacryloyloxy, acryloylamino, methacryloylamino, vinyl, or vinyloxy group, $Sp^1$ and $Sp^2$ are the same as or different from each other, and each represent a C1-C6 linear, branched, or cyclic alkylene or alkyleneoxy group, or a direct bond, and at least one hydrogen atom in each phenylene group may be replaced.

In the above aspect of the method for producing a liquid crystal display device, the first polymer in the alignment films contains at least one selected from the functional group represented by the formula (A-1) and the functional group represented by the formula (A-2). This configuration enables polymerization of the monomer added to the liquid crystal layer without adding a polymerization initiator or an initiator monomer to the liquid crystal layer. Also, radicals can be generated from these functional groups and reacted with the monomer added to the liquid crystal layer, so that the alignment film and the second polymer contained in the polymer layer can be covalently bonded to each other. This increases the formation rate of the polymer layer (polymerization rate of the monomer), reducing the ultraviolet ray irradiation dose for the liquid crystal layer in the polymer layer formation. Also, the polymer layer can be easily formed since it contains the second polymer obtained by polymerizing at least one monomer including at least one monomer represented by the formula (1), further reducing the ultraviolet ray irradiation dose for the liquid crystal layer 40 in the polymer layer formation. This is because a polymer of the monomer (1) is likely to separate from the liquid crystal layer 40. These conditions can prevent a VHR decrease and a residual DC voltage increase even when the liquid crystal display device of the present embodiment is used for a long period of time.

The at least one monomer represented by the formula (1) may include at least one monomer represented by any of the following formulas (2-1) and (2-2):

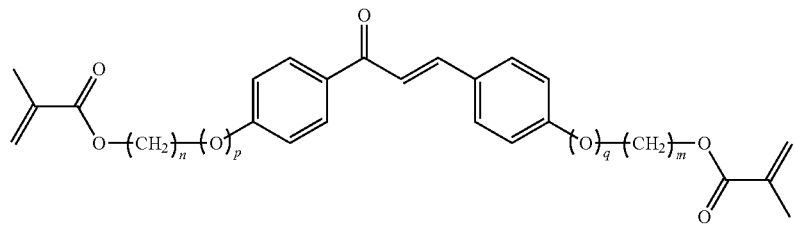

(2-1)

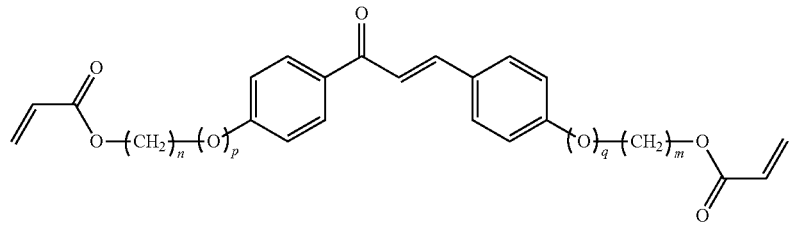

(2-2)

wherein p and q are the same as or different from each other, and each 0 or 1, and m and n are the same as or different from each other, and each an integer of 0 to 6.

The at least one monomer represented by the formula (1) may include at least one monomer represented by any of the following formulas (3-1) to (3-8):

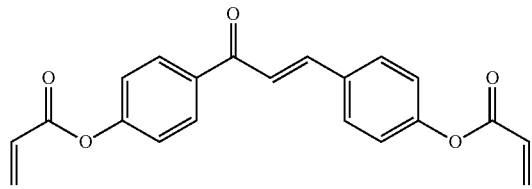

(3-1)

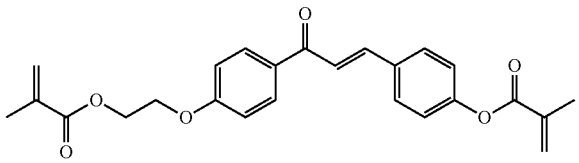

(3-2)

-continued (3-3)

(3-4)
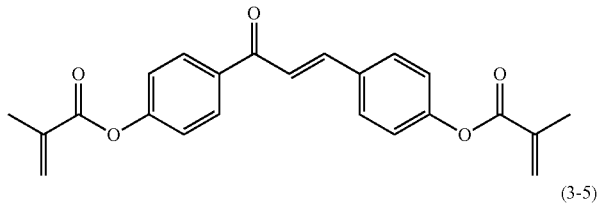

(3-5)
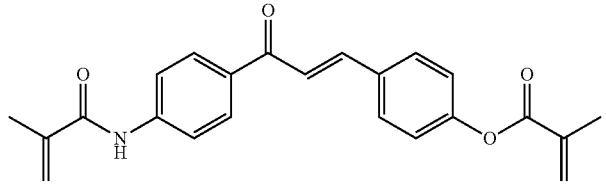

(3-6)
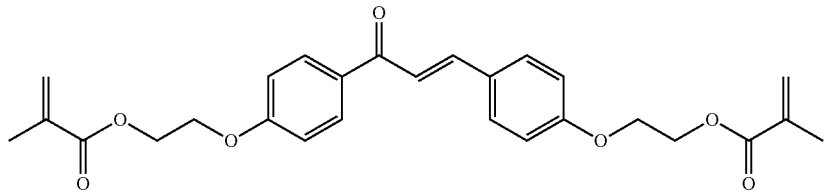

(3-7)
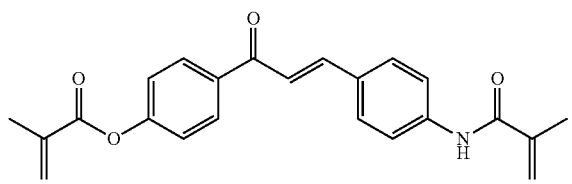

(3-8)
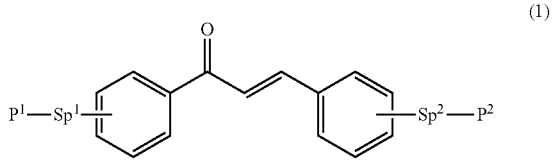

The first polymer may contain at least one photo-functional group.

The forming a polymer layer may include irradiating the liquid crystal layer with polarized ultraviolet light so as to polymerize the at least one monomer including at least one monomer represented by the formula (1).

The forming a polymer layer may include irradiating the liquid crystal layer with unpolarized ultraviolet light so as to polymerize the at least one monomer including at least one monomer represented by the formula (1).

What is claimed is:

1. A liquid crystal display device comprising:
a pair of substrates;
a liquid crystal layer held between the pair of substrates;
an alignment film disposed on a liquid crystal layer side surface of at least one of the pair of substrates; and
a polymer layer disposed between the liquid crystal layer and the alignment film,
the liquid crystal layer containing liquid crystal compounds aligned in a predetermined direction with no voltage applied,
the alignment film containing a first polymer containing in its main chain at least one selected from a polyamic acid structure and a polyimide structure,
the first polymer containing a functional group represented by the following formula (A-1),
the polymer layer containing a second polymer obtained by polymerizing at least one monomer including at least one monomer represented by the following formula (1):

(A-1)
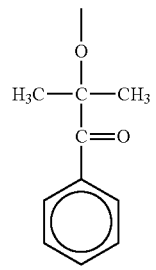

(1)
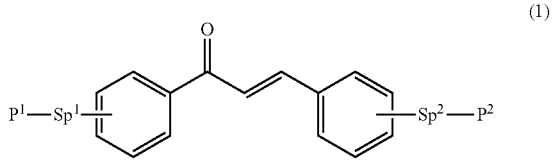

wherein P1 and P2 are the same as or different from each other, and each represent an acryloyloxy, methacryloyloxy, acryloylamino, methacryloylamino, vinyl, or vinyloxy group, Sp1 and Sp2 are the same as or different from each other, and each represent a C1-C6 linear, branched, or cyclic alkylene or alkyleneoxy group, or a direct bond, at least one hydrogen atom in each phenylene group may be replaced, and the at least one monomer represented by the formula (1) includes at least one monomer represented by any of the following formulas (3-2), (3-3), (3-5), (3-6), (3-7) or (3-8):

functional group selected from the group consisting of a cinnamate group, an azobenzene group, a chalcone group, and a coumarin group, each of which may contain a substituent.

(3-2)

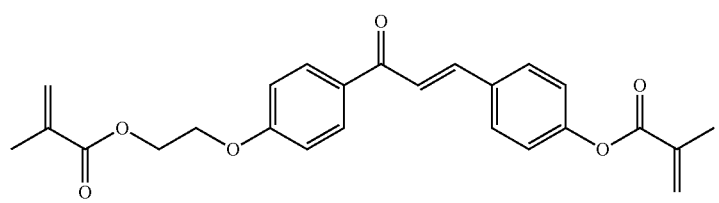

(3-3)

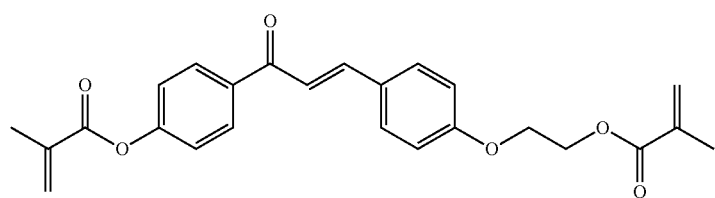

(3-5)

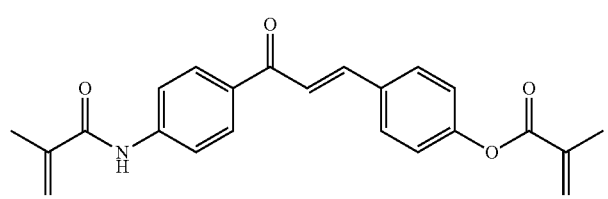

(3-6)

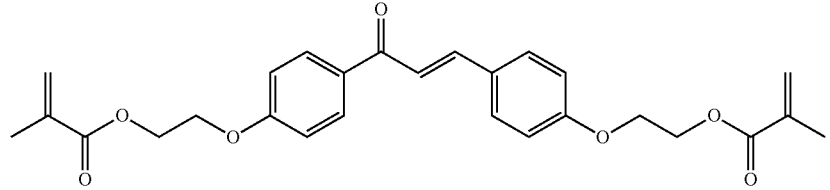

(3-7)

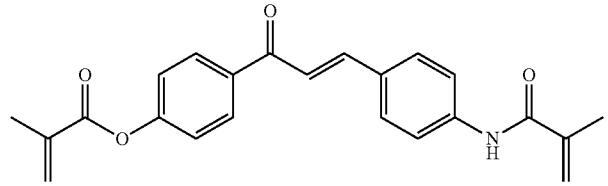

(3-8)

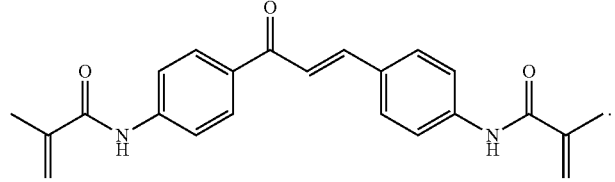

2. The liquid crystal display device according to claim 1, wherein the first polymer contains at least one photofunctional group.

3. The liquid crystal display device according to claim 2, wherein the first polymer contains at least one photo- 4. The liquid crystal display device according to claim 1, wherein
the liquid crystal display device is in a liquid crystal driving mode of a horizontal alignment mode, and
the polymer layer aligns the liquid crystal compounds in a direction parallel to surfaces of the pair of substrates.

5. The liquid crystal display device according to claim 1, wherein the liquid crystal display device is in a liquid crystal driving mode of an FFS mode, an IPS mode, an MVA mode, or a 4D-RTN mode.

6. A method for producing a liquid crystal display device including a liquid crystal layer containing liquid crystal compounds aligned in a predetermined direction with no voltage applied, the method comprising:

preparing a pair of substrates;

forming an alignment film by applying to a surface of at least one of the pair of substrates an alignment agent that contains a first polymer containing at least one selected from a polyamic acid structure and a polyimide structure in its main chain and a functional group represented by the following formula (A-1);

forming a liquid crystal layer by sealing, between the pair of substrates on at least one of which the alignment film is formed, a liquid crystal composition containing a liquid crystal material and at least one monomer including at least one monomer represented by the following formula (1); and forming a polymer layer from a second polymer between the alignment film and the liquid crystal layer by irradiating the liquid crystal layer with ultraviolet light, the second polymer being obtained by polymerizing at least one monomer including at least one monomer represented by the following formula (1),

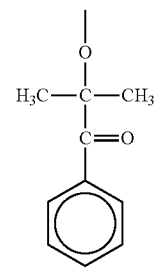

(A-1)

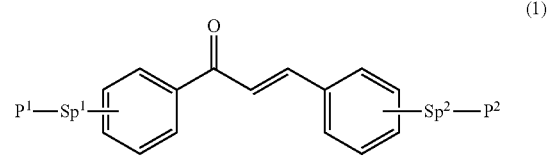

(1)

wherein P1 and P2 are the same as or different from each other, and each represent an acryloyloxy, methacryloyloxy, acryloylamino, methacryloylamino, vinyl, or vinyloxy group, Sp1 and Sp2 are the same as or different from each other, and each represent a C1-C6 linear, branched, or cyclic alkylene or alkyleneoxy group, or a direct bond, at least one hydrogen atom in each phenylene group may be replaced, and the at least one monomer represented by the formula (1) includes at least one monomer represented by any of the following formulas (3-2), (3-3), (3-5), (3-6), (3-7) or (3-8):

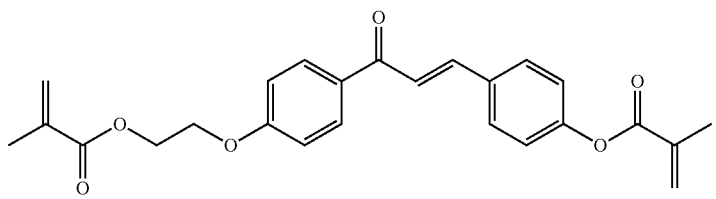

(3-2)

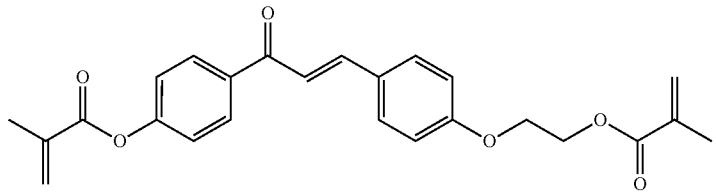

(3-3)

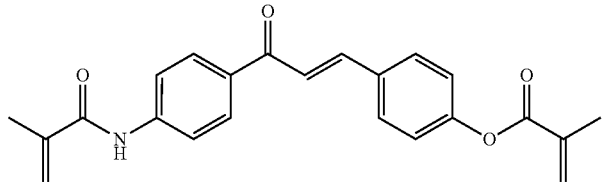

(3-5)

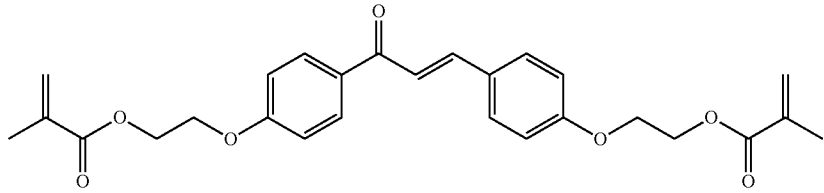

(3-6)

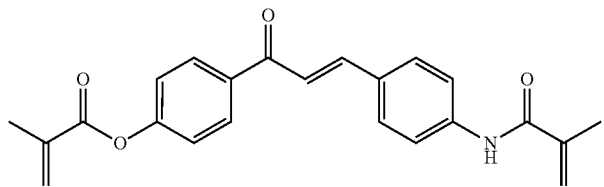
(3-7)

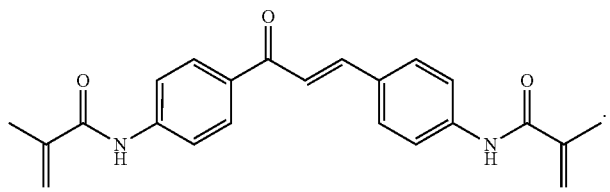
(3-8)

7. The method for producing a liquid crystal display device according to claim 6, wherein the first polymer contains at least one photo-functional group.

8. The method for producing a liquid crystal display device according to claim 6, wherein forming the polymer layer includes irradiating the liquid crystal layer with polarized ultraviolet light so as to polymerize the at least one monomer including at least one monomer represented by the formula (1).

9. The method for producing a liquid crystal display device according to claim 6, wherein forming the polymer layer includes irradiating the liquid crystal layer with unpolarized ultraviolet light so as to polymerize the at least one monomer including at least one monomer represented by the formula (1).

* * * * *